United States Patent
Koike et al.

(10) Patent No.: US 8,750,399 B2
(45) Date of Patent: Jun. 10, 2014

(54) RADIO TERMINAL AND DEMODULATION METHOD

(75) Inventors: Chimato Koike, Fujisawa (JP); Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 13/495,726

(22) Filed: Jun. 13, 2012

(65) Prior Publication Data

US 2013/0010905 A1    Jan. 10, 2013

(30) Foreign Application Priority Data

Jul. 6, 2011   (JP) .................................. 2011-149889

(51) Int. Cl.
  *H04L 5/12*   (2006.01)
(52) U.S. Cl.
  USPC ......................................................... 375/262
(58) Field of Classification Search
  USPC .................... 375/219, 262, 267, 341
  See application file for complete search history.

(56) References Cited

U.S. PATENT DOCUMENTS

| | | | |
|---|---|---|---|
| 2009/0042511 A1* | 2/2009 | Malladi | 455/62 |
| 2009/0067553 A1* | 3/2009 | McElwain | 375/341 |
| 2009/0310695 A1* | 12/2009 | Sawai | 375/262 |
| 2010/0067598 A1* | 3/2010 | Sampath et al. | 375/262 |
| 2011/0129028 A1* | 6/2011 | Lee et al. | 375/262 |

FOREIGN PATENT DOCUMENTS

| | | |
|---|---|---|
| JP | 2007-215038 | 8/2007 |
| JP | 2008-118380 | 5/2008 |
| JP | 2008-228145 | 9/2008 |
| WO | WO-2007/091317 | 8/2007 |

* cited by examiner

*Primary Examiner* — Leon-Viet Nguyen
(74) *Attorney, Agent, or Firm* — Fujitsu Patent Center

(57) ABSTRACT

A receiving unit receives information on a modulation scheme applied to signals to a radio terminal from a transmission apparatus. An MLD unit performs maximum likelihood detection of a received signal by using a modulation scheme based on the information received by the receiving unit and a plurality of modulation schemes applicable to signals to the other radio terminals. An estimation unit estimates a modulation scheme applied to signals to the other radio terminals based on predetermined information obtained in a maximum likelihood detection process in each of the plurality of modulation schemes of the MLD unit. A controller controls the MLD unit to perform maximum likelihood detection by using the modulation scheme estimated by the estimation unit and the modulation scheme received by the receiving unit.

8 Claims, 16 Drawing Sheets

RADIO TERMINAL AND DEMODULATION METHOD

CROSS-REFERENCE TO RELATED APPLICATION

This application is based upon and claims the benefit of priority of the prior Japanese Patent Application No. 2011-149889, filed on Jul. 6, 2011, the entire contents of which are incorporated herein by reference.

FIELD

The embodiment discussed herein is related to a radio terminal which performs radio communication by using a plurality of antennas and a demodulation method thereof.

BACKGROUND

In recent years, to respond to the data volume of increasing radio communication, a mobile communication system using an OFDMA (Orthogonal Frequency Division Multiple Access) capable of achieving high frequency utilization efficiency is put to practical use. In a mobile phone system thereof, a standard of an LTE (Long Term Evolution) system is laid down in a 3GPP (3rd generation partnership project). Also, a standard of an LTE-A (LTE-Advanced) system obtained by further evolving the LTE system is being processed.

In the LTE and LTE-A systems, in addition to an OFDMA, a MIMO (Multi-Input Multi-Output) technology for performing radio communication by using a plurality of transmitting and receiving antennas is used in order to further improve frequency utilization efficiency.

In the radio communication using the MIMO technology, different signals are simultaneously transmitted by a plurality of antennas on the transmission side, and their signals are received by a plurality of antennas on the reception side. In thus received signals, the signals transmitted by the plurality of antennas are mixed and demodulation processing for separating signals in each transmitting antenna from the received signals is performed on the reception side.

With regard to a demodulation technique of MIMO, various techniques are used. Examples of the typical technique include MLD (Maximum Likelihood Detection), MMSE (Minimum Mean Square Error), and ZF (Zero Forcing). In the MLD, an error rate may be minimized; however, the calculation load is large. On the other hand, the MMSE and ZF each have error rates poorer than that of the MLD; however, the calculation load smaller than that of the MLD because they are linear processing.

In terms of the number of radio terminals (users) on the reception side, a MIMO system is classified into two, namely, a SU-MIMO (Single User-MIMO) mode and a MU-MIMO (Multi User-MIMO) mode. In the SU-MIMO mode, signals to one radio terminal are transmitted by a plurality of antennas on the transmission side. On the other hand, in the MU-MIMO mode, signals to a plurality of radio terminals are simultaneously transmitted by different antennas on the transmission side. In DL (Downlink) communication of the LTE system, 2×2 MU-MIMO modes using UE-Specific RS are regulated as a Transmission Mode 8. In the LTE-A system, MIMO systems up to 8×8 are further regulated as a Transmission Mode 9. Since the possibility that the MU-MIMO mode is used in the LTE-A system is also left, it is considered that importance of the MU-MIMO mode more increases in the future.

In the MU-MIMO mode, even if a modulation scheme of the other multiplexed user is not known, a radio terminal demodulates a received signal by using the MMSE and ZF. On the other hand, in the MLD, a radio terminal needs to know a modulation scheme applied to its own and a modulation scheme of the other multiplexed user in order to demodulate a received signal. The reason is that in the MLD, the modulation scheme applied to its own and the modulation scheme of the other multiplexed user are needed in order to generate replicas of the transmitted signals.

Suppose, for example, that the modulation scheme applied to the transmitted signals of its own is QPSK (Quadrature Phase Shift Keying). Suppose, further, that the modulation scheme applied to the transmitted signals of the other multiplexed user is 16 QAM (Quadrature Amplitude Modulation). When knowing the modulation schemes of QPSK and 16 QAM, the radio terminal generates 4×16 replicas and performs MLD.

Conventionally, there is proposed a receiving unit, control program, and reception control method in a MU-MIMO system in which a calculation load based on a QRM-MLD technique for signal separation is reduced (see, for example, Japanese Laid-open Patent Publication No. 2008-228145).

Further, there is proposed a communication device and a communication method, wherein maximum likelihood detection is applied for reception-side signal detection algorithm in a MU-MIMO system (see, for example, Japanese Laid-open Patent Publication No. 2008-118380).

In some mobile communication systems, a modulation scheme applied to a transmitted signal of its own is notified from the transmission side; however, a modulation scheme applied to a transmitted signal of the other multiplexed radio terminal is not notified from the transmission side. In this case, there arises a problem that in the MLD, a radio terminal fails to demodulate the received signal.

SUMMARY

In one aspect of the embodiments, there is provided a radio terminal to perform radio communication by using a plurality of antennas. The radio terminal includes a receiving unit which receives information on a modulation scheme applied to a signal to the radio terminal from a transmission apparatus; a maximum likelihood detection unit which performs maximum likelihood detection of a received signal by using a modulation scheme based on information received by the receiving unit and a plurality of modulation schemes applicable to a signal to another radio terminal; an estimation unit which estimates a modulation scheme applied to a signal to the other radio terminal based on predetermined information obtained in a maximum likelihood detection process in each of the plurality of modulation schemes of the maximum likelihood detection unit; and a controller which controls the maximum likelihood detection unit to perform maximum likelihood detection by using the modulation scheme estimated by the estimation unit and the modulation scheme received by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
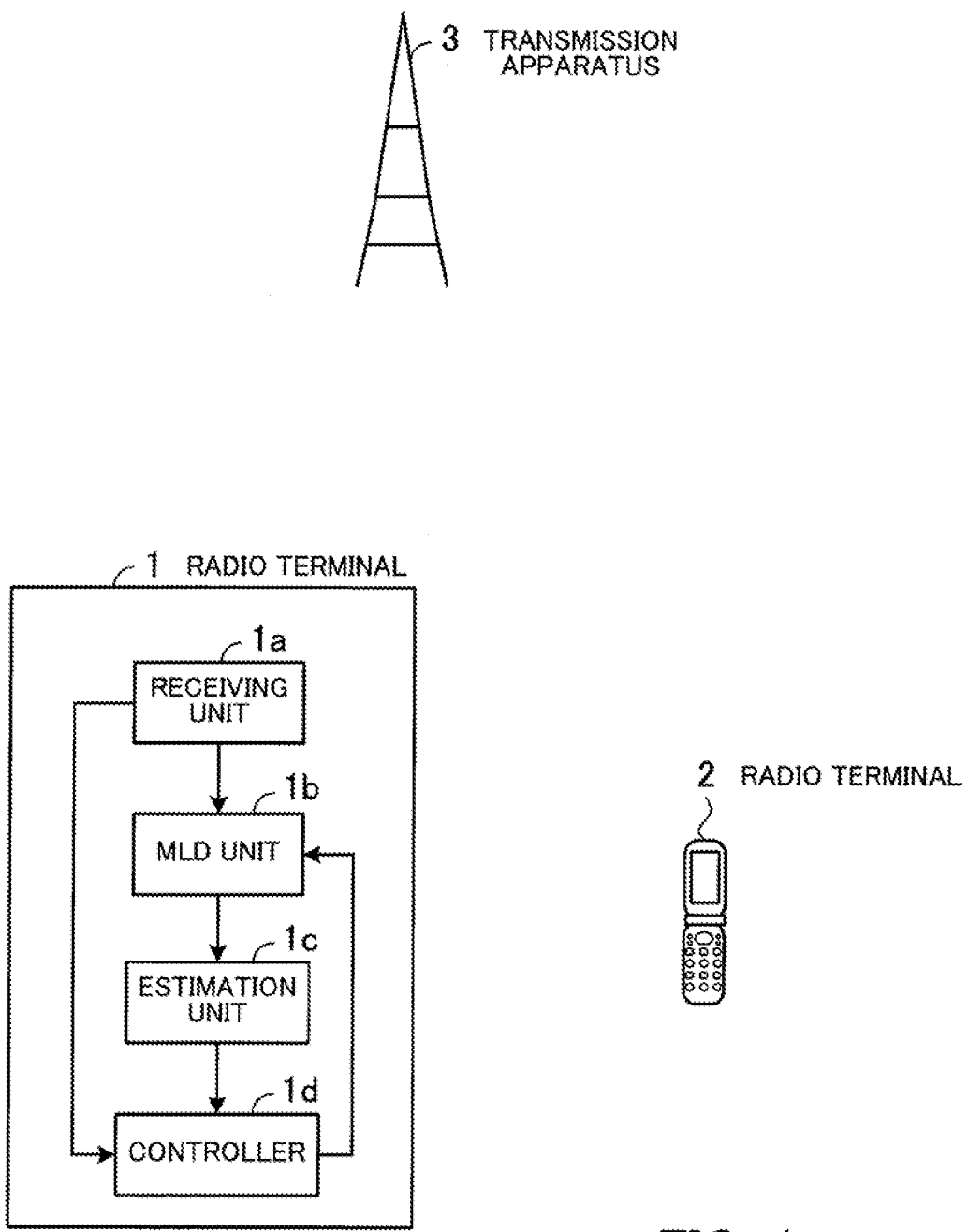
FIG. 1 illustrates a mobile communication system according to a first embodiment.

Hereinafter, preferred embodiments of the present invention will now be described in detail below with reference to the accompanying drawings, wherein like reference numerals refer to like elements throughout.

First Embodiment

FIG. 1 illustrates a mobile communication system according to a first embodiment. As illustrated in FIG. 1, the mobile communication system includes radio terminals 1 and 2, and a transmission apparatus 3. The radio terminals 1 and 2 are, for example, mobile phone sets, and the transmission apparatus 3 is, for example, a base station. Each of the radio terminals 1 and 2, and the transmission apparatus 3 has a plurality of antennas, and performs radio communication through a MIMO technology.

In the mobile communication system illustrated in FIG. 1, information on a modulation scheme applied to a transmitted signal to its own is notified through control parameter by the transmission apparatus 3. However, information on a modulation scheme of the other multiplexed user is not notified.

Suppose, for example, that QPSK is applied to signals (Down Link signal) from the transmission apparatus 3 to the radio terminal 1. To signals to the radio terminal 2 from the transmission apparatus 3, 16 QAM is supposed to be applied. In this case, to the radio terminal 1, information to the effect that QPSK is applied to signals to its own (radio terminal 1) is notified through the control parameter by the transmission apparatus 3. However, the radio terminal 1 is not notified of information on the modulation scheme 16 QAM of the other radio terminal 2. The radio terminal 2 is notified of information to the effect that 16 QAM is applied to signals to its own (radio terminal 2) through the control parameter by the transmission apparatus 3. However, the radio terminal 2 is not notified of information on the modulation scheme QPSK of the other radio terminal 1.

As illustrated in FIG. 1, the radio terminal 1 has a receiving unit 1a, a maximum likelihood detection unit (hereinafter, referred to as an MLD unit) 1b, an estimation unit 1c, and a controller 1d. Also, the radio terminal 2 has the same units as those of the radio terminal 1.

The receiving unit 1a receives information on the modulation scheme applied to signals to the radio terminal 1 from the transmission apparatus 3.

Suppose, for example, that the modulation scheme of QPSK is applied to signals to the radio terminal 1 as in the above-described example. In this case, the receiving unit 1a receives QPSK information through the control parameter transmitted by the transmission apparatus 3.

The MLD unit 1b performs MLD of a received signal by using a modulation scheme based on the information received by the receiving unit 1a and a plurality of modulation schemes applicable to signals to the other radio terminal 2.

Suppose, for example, that in the mobile communication system of FIG. 1, any of QPSK, 16 QAM, and 64 QAM is used as the modulation scheme applied to the radio terminals 1 and 2. QPSK is supposed to be applied to signals to the radio terminal 1.

In this case, the receiving unit 1a receives the QPSK information, and the MLD unit 1b performs MLD of a received signal by using QPSK received by the receiving unit 1a and the modulation scheme QPSK applicable to signals to the other radio terminal 2. The MLD unit 1b further performs MLD of a received signal by using QPSK received by the receiving unit 1a and the modulation scheme 16 QAM applicable to signals to the other radio terminal 2. The MLD unit 1b further performs MLD of a received signal by using QPSK received by the receiving unit 1a and the modulation scheme 64 QAM applicable to signals to the other radio terminal 2. The MLD is performed by using a generally known method, and a distance, minimum distance, and minimum cumulative distance between a reception symbol and a replica are obtained in the process stage.

The estimation unit 1c estimates a modification scheme applied to signals to the other radio terminal 2 based on predetermined information obtained in an MLD process stage in each of the plurality of the modification schemes in the MLD unit 1b. Examples of the predetermined information obtained in the MLD process stage include the minimum distance and minimum cumulative distance between a reception symbol and a replica.

Suppose, for example, that the receiving unit 1a receives the QPSK information from the transmission apparatus 3 in the same manner as in the above-described example. In this case, the estimation unit 1c estimates a modulation scheme applied to signals to the other radio terminal 2, for example, based on the minimum cumulative distance obtained in the MLD process stage using QPSK and QPSK in the MLD unit 1b, the minimum cumulative distance obtained in the MLD process stage using QPSK and 16 QAM in the MLD unit 1b, and the minimum cumulative distance obtained in the MLD process stage using QPSK and 64 QAM in the MLD unit 1b.

The estimation unit 1c estimates, for example, that the modulation scheme in which the minimum cumulative distance is smallest is a modulation scheme applied to signals to the other radio terminal 2. Suppose, for example, that the minimum cumulative distance obtained in the MLD process stage using QPSK and 16 QAM in the MLD unit 1b is smaller than the minimum cumulative distances of the other modulation schemes. In this case, the estimation unit 1c estimates that the modulation scheme of 16 QAM is applied to signals to the other radio terminal 2.

The controller 1d controls the MLD unit 1b to perform MLD by using the modulation scheme estimated by the estimation unit 1c and the modulation scheme received by the receiving unit 1a.

Suppose, for example, that the estimation unit 1c estimates that the modulation scheme of 16 QAM is applied to signals to the other radio terminal 2. In this case, the controller 1*d* controls the MLD unit 1*b* to perform MLD by using the modulation scheme QPSK received by the receiving unit 1*a* and the modulation scheme 16 QAM estimated by the estimation unit 1*c*.

Figure 2:
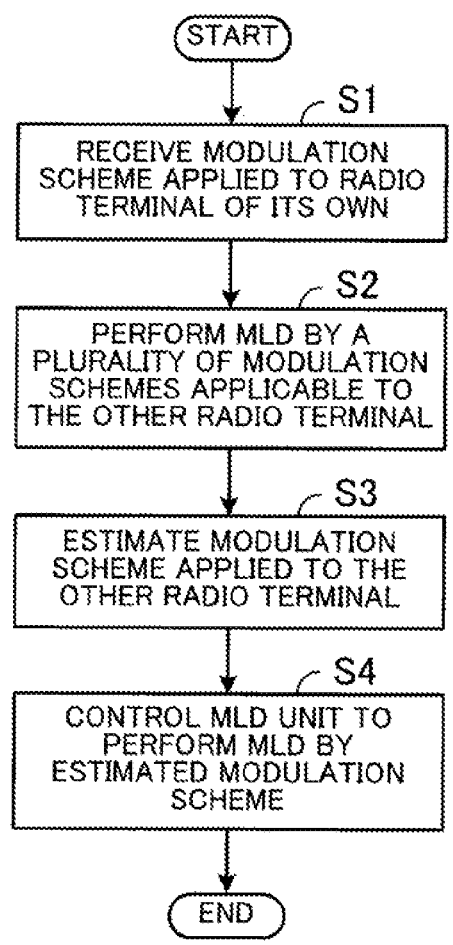
FIG. 2 is a flowchart illustrating operations of a radio terminal.

FIG. 2 is a flowchart illustrating operations of the radio terminal. Operations illustrated in the flowchart are performed by the after-mentioned signal processing HW (Hardware), DSP (Digital Signal Processor), and CPU (Central Processing Unit).

(Step S1) The receiving unit 1*a* of the radio terminal 1 receives information on the modulation scheme applied to signals to the radio terminal 1 from the transmission apparatus 3.

(Step S2) The MLD unit 1*b* performs MLD of a received signal by using the modulation scheme based on the information received by the receiving unit 1*a* and the plurality of the modulation schemes applicable to signals to the other radio terminal 2.

(Step S3) The estimation unit 1*c* estimates a modulation scheme applied to signals to the other radio terminal 2 based on predetermined information obtained in the MLD process stage in each of the plurality of modulation schemes in the MLD unit 1*b*.

(Step S4) The controller 1*d* controls the MLD unit 1*b* to perform MLD by using the modulation scheme estimated by the estimation unit 1*c* and the modulation scheme received by the receiving unit 1*a*.

As can be seen from the above discussion, the radio terminal 1 receives a modulation scheme applied to signals to its own, and performs MLD by using the received modulation scheme and the plurality of the modulation schemes applicable to the other radio terminal 2. The radio terminal 1 then estimates a modulation scheme applied to signals to the other radio terminal 2 based on predetermined information obtained in the MLD process stage in each of the plurality of the modulation schemes in the MLD unit 1*b*. Through the process, the radio terminal 1 demodulates a received signal even if the modulation scheme of the other multiplexed radio terminal 2 is not notified.

Second Embodiment

Next, a second embodiment will be described in detail with reference to the accompanying drawings.

Figure 3:
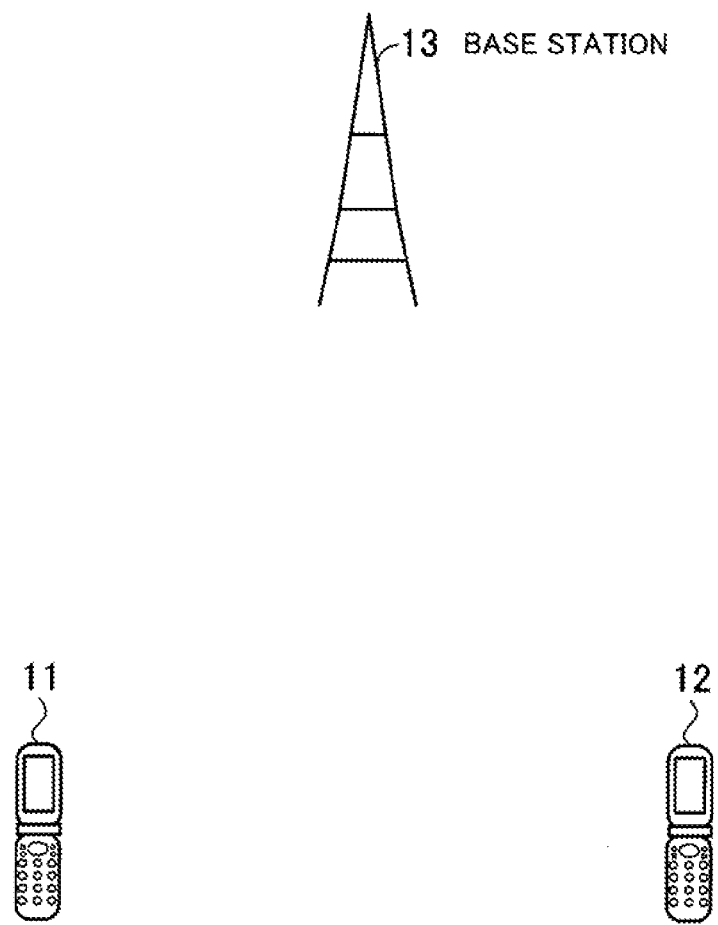
FIG. 3 illustrates a mobile communication system according to a second embodiment.

FIG. 3 illustrates a mobile communication system according to the second embodiment. As illustrated in FIG. 3, the mobile communication system has radio terminals 11 and 12, and a base station 13. Examples of the radio terminals 11 and 12 include a mobile phone set. The radio terminals 11 and 12, and the base station 13 each perform radio communication, for example, based on an LTE or LTE-A system. Each of the radio terminals 11 and 12, and the base station 13 has a plurality of antennas, and performs radio communication by using the MIMO technology.

The base station 13 arranges signals modulated by QPSK, 16 QAM, and 64 QAM on OFDM symbols, and transmits them to the radio terminals 11 and 12. By using the MLD, the radio terminals 11 and 12 each demodulate signals transmitted by the base station 13.

For example, the base station 13 transmits signals to the radio terminal 11 by using the modulation scheme 64 QAM. The base station 13 further transmits signals to the radio terminal 12 by using the modulation scheme 16 QAM. The radio terminals 11 and 12 each demodulate signals transmitted by the base station 13 by using the MLD.

Hereinafter, descriptions will be made assuming that any modulation scheme of QPSK, 16 QAM, and 64 QAM is applied to signals transmitted by the base station 13.

In the MU-MIMO mode in the LTE and LTE-A systems, information on the modulation scheme applied to a transmitted signal to its own of the radio terminals 11 and 12 is notified by the base station 13 through the control parameter. However, information on the modulation scheme of the other multiplexed radio terminal is not notified. For example, the radio terminal 11 is notified of the modulation scheme applied to its own by the base station 13 through the control parameter; however, not notified of the modulation scheme applied to the other radio terminal 12.

To cope with the above problem, the radio terminal 11 estimates the modulation scheme of the other radio terminal 12, performs MLD by using the estimated modulation scheme and the modulation scheme applied to signals to its own, and demodulates and decodes received signals. Before describing the radio terminal 11 in detail, the SU-MIMO mode, MU-MIMO mode, a relationship between a demodulation scheme and a BER (Bit Error Rate), and radio resources will be described.

The SU-MIMO and MU-MIMO modes will be first described.

Figure 4:
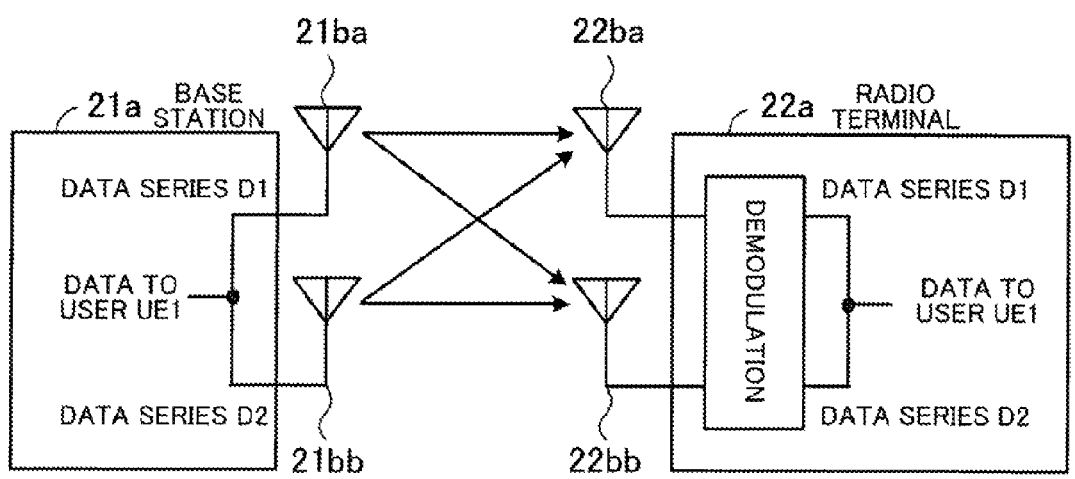
FIG. 4 illustrates SU-MIMO.

FIG. 4 illustrates the SU-MIMO mode. As illustrated in FIG. 4, a base station 21*a* separates data to a user UE1 (to a radio terminal 22*a*) into data series D1 and D2. The data series D1 is radio-transmitted to the radio terminal 22*a* by an antenna 21*ba*, and the data series D2 is radio-transmitted to the radio terminal 22*a* by an antenna 21*bb*.

The radio terminal 22*a* receives signals radio-transmitted by the antennas 21*ba* and 21*bb* of the base station 21*a* by antennas 22*ba* and 22*bb*. The received signals are demodulated to the data series D1 and D2, and received as data to the user UE1 (radio terminal 22*a*).

Figure 5:
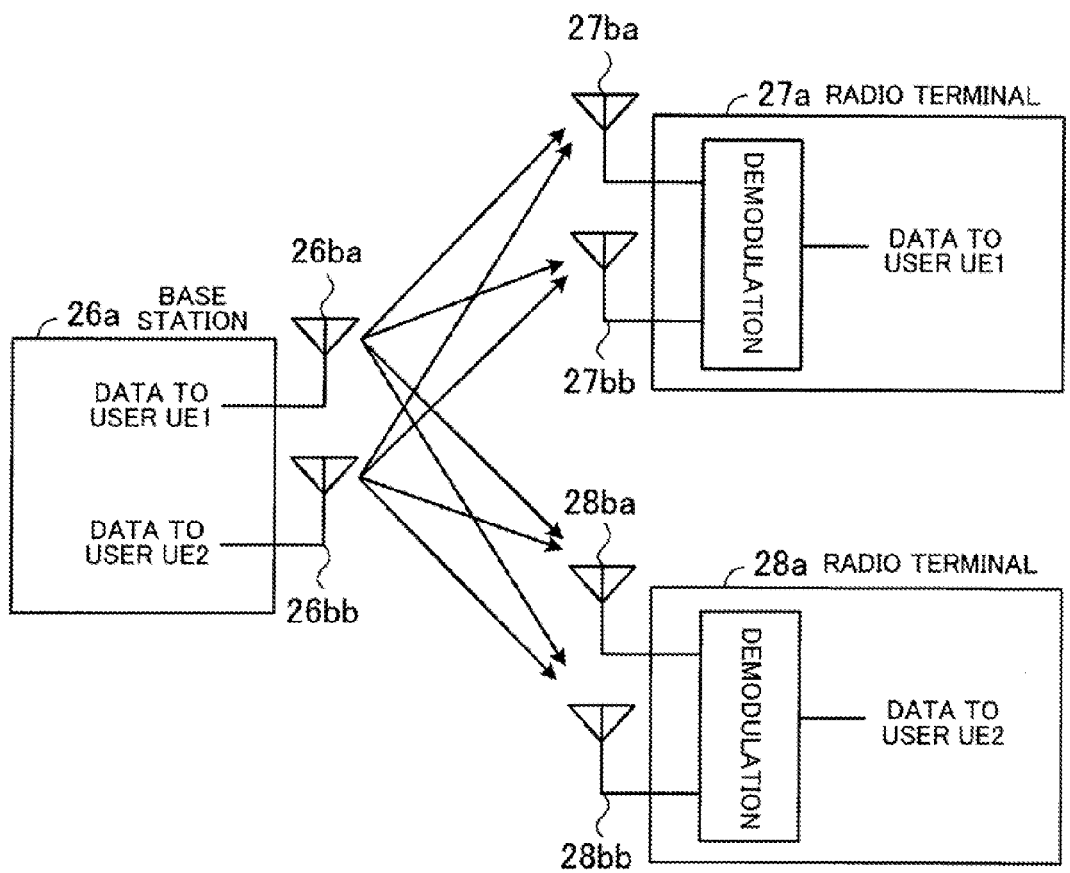
FIG. 5 illustrates MU-MIMO.

FIG. 5 illustrates the MU-MIMO mode. As illustrated in FIG. 5, the base station 26*a* radio-transmits data to a user UE1 (radio terminal 27*a*) by an antenna 26*ba*. The base station 26*a* further radio-transmits data to a user UE2 (radio terminal 28*a*) by an antenna 26*bb*.

The radio terminal 27*a* receives signals radio-transmitted by the antennas 26*ba* and 26*bb* of the base station 26*a* by antennas 27*ba* and 27*bb*. Signals radio-transmitted from the base station 26*a* are multiplexed, and the radio terminal 27*a* demodulates signals to its own (to the user UE1) from the received signals.

The radio terminal 28*a* receives signals radio-transmitted by the antennas 26*ba* and 26*bb* of the base station 26*a* by antennas 28*ba* and 28*bb*. Signals radio-transmitted from the base station 26*a* are multiplexed, and the radio terminal 28*a* demodulates signals to its own (to the user UE2) from the received signals.

That is, as illustrated in FIG. 4, in the SU-MIMO mode, the base station 21*a* of the transmission side transmits signals to one user UE1 (radio terminal 22*a*) by a plurality of the antennas 21*ba* and 21*bb*. On the other hand, as illustrated in FIG. 5, in the MU-MIMO mode, the base station 26*a* of the transmission side simultaneously transmits signals to a plurality of the users UE1 and UE2 (radio terminals 27*a* and 28*a*) by the separate antennas 26*ba* and 26*bb*.

A relationship between a demodulation scheme and a BER (Bit Error Rate) will be described.

Figure 6:
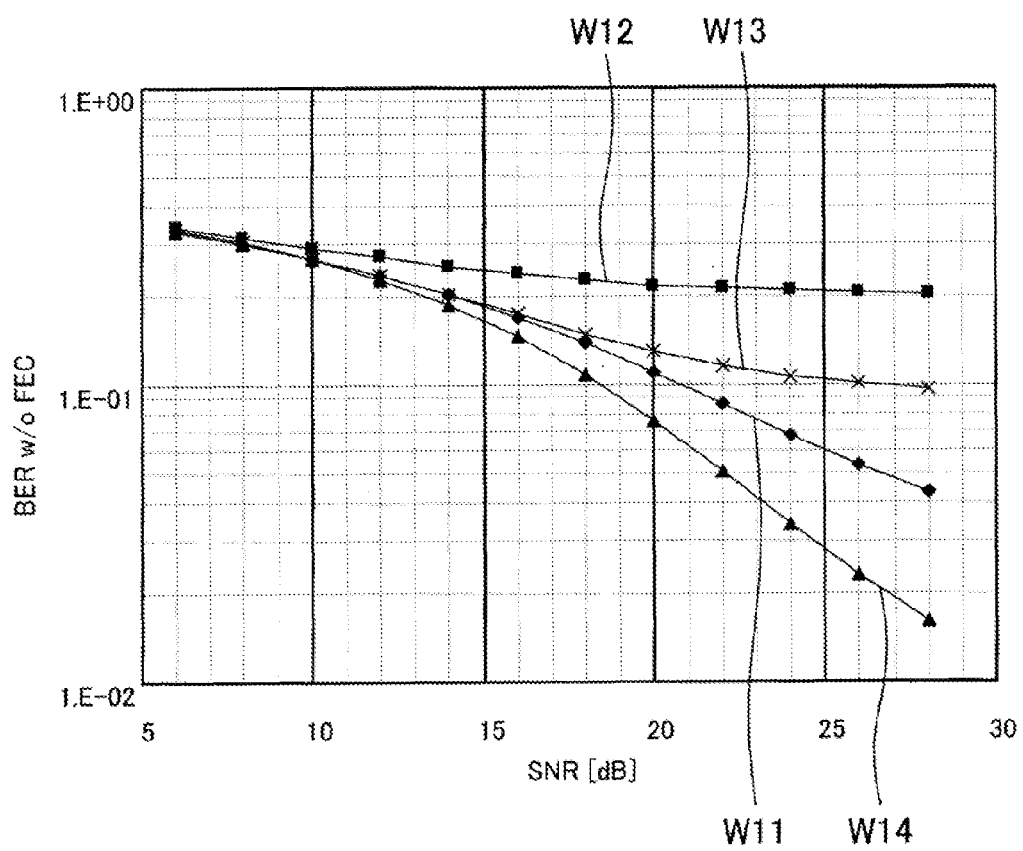
FIG. 6 illustrates a relationship between a demodulation scheme and a BER.

FIG. 6 illustrates a relationship between the demodulation scheme and the BER. The horizontal axis of FIG. 6 represents the SNR [dB], and the vertical axis represents the error rate.

A curve W11 illustrated in FIG. 6 represents the error rate in the case where a received signal is demodulated by using MMSE in the radio terminal of the MU-MIMO mode.

Curves W12 to W14 each represent error rates in the case where a received signal is demodulated by using MLD in the radio terminal of the MU-MIMO mode. Note that although a modulation scheme of the other multiplexed radio terminal is 16 QAM, the curve W12 represents an error rate in the case where MLD is performed assuming that the modulation scheme of the other radio terminal is QPSK. Further, although a modulation scheme of the other multiplexed radio terminal is 16 QAM, the curve W13 represents an error rate in the case where MLD is performed assuming that the modulation scheme of the other radio terminal is 64 QAM. The curve W14 represents an error rate in the case where the modulation scheme of the other multiplexed radio terminal is 16 QAM and MLD is performed assuming that the modulation scheme of the other radio terminal is 16 QAM. Note that the modulation scheme of 64 QAM is supposed to be applied to signals to its own.

As illustrated in the curves W12 and W13, in the case where MLD is performed by using the modulation scheme different from that applied to the other multiplexed radio terminal, the error rate of the received signal becomes worse than that of the MMSE illustrated in the curve W11.

On the other hand, as illustrated in the curve W14, in the case where the MLD is performed by using the same modulation scheme as that applied to the other multiplexed radio terminal, the error rate of the received signal becomes better than that of the MMSE illustrated in the curve W11.

That is, in the case where the modulation scheme of the other multiplexed radio terminal is correctly estimated to be 16 QAM and MLD is performed, a preferable error rate is obtained as compared with the MMSE. On the other hand, in the case where the modulation scheme of the other radio terminal is incorrectly estimated to be QPSK or 64 QAM, an error rate becomes bad as compared with the MMSE.

Radio resources will be described.

Figure 7:
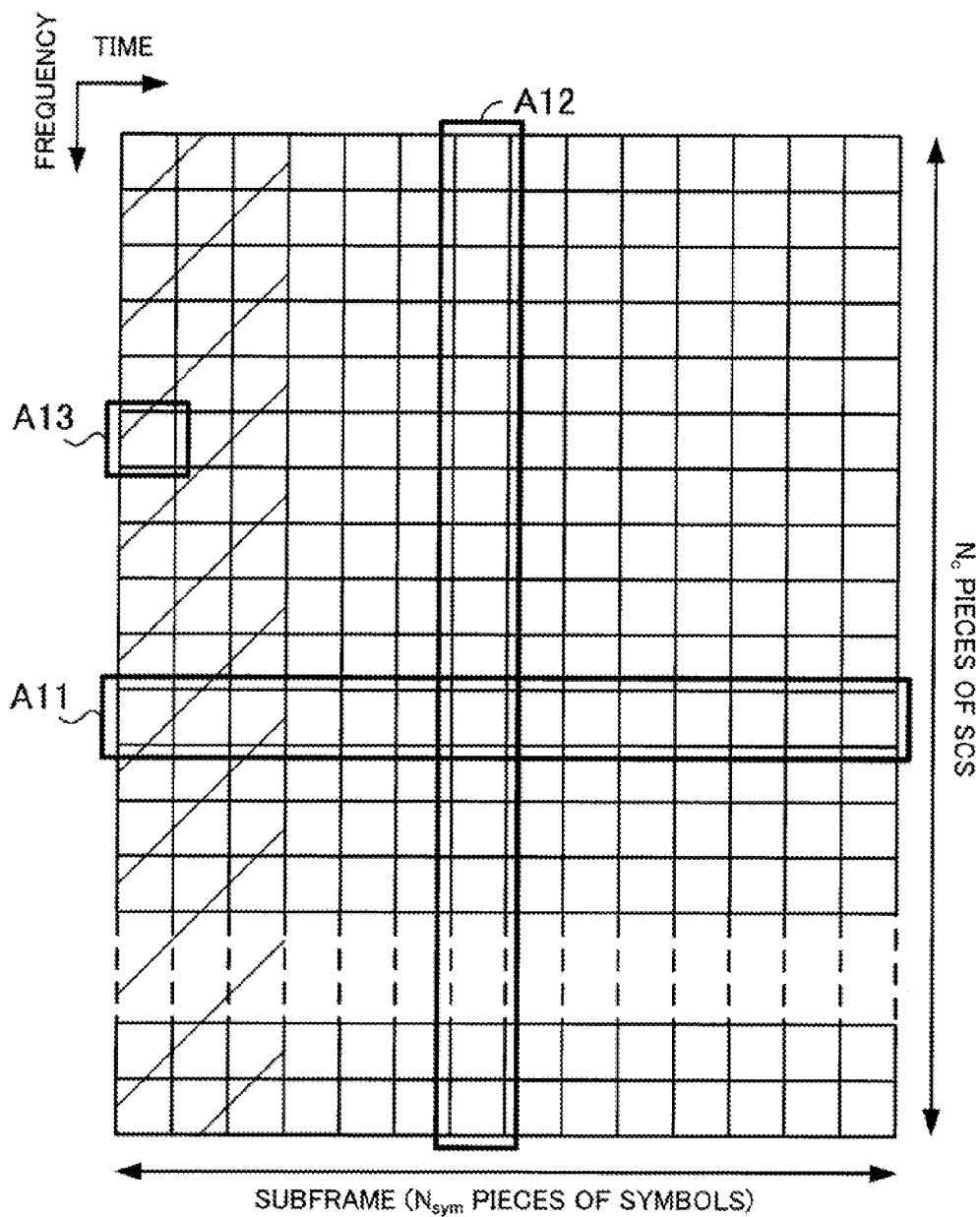
FIG. 7 illustrates radio resources in a DL.

FIG. 7 illustrates radio resources in a DL. The horizontal axis of FIG. 7 represents the time, and the vertical axis represents the frequency. A frame A11 illustrated in FIG. 7 represents an SC (SubCarrier) unit. A frame A12 represents a symbol unit.

One SC on a certain symbol is referred to as an RE (Resource Element). For example, a frame A13 represents an RE. Further, $N_{sym}$ pieces of symbols are collectively referred to as a subframe.

The base station 13 assigns the control parameter over several symbols from a head of the time direction of the subframe, and transmits it to the radio terminals 11 and 12, respectively. For example, the base station 13 assigns the control parameter to a shaded area of FIG. 7, and transmits it to the radio terminals 11 and 12, respectively.

The base station 13 assigns data signals to the remaining area of the subframe, and transmits them to the radio terminals 11 and 12. The base station 13 arranges signals modulated by any of QPSK, 16 QAM, and 64 QAM in $N_c$ pieces of subcarriers on the OFDM symbols, and transmits them to the radio terminals 11 and 12.

A block sectioned by 12 subcarriers in the frequency direction is referred to as an RB (Resource Block). Further, a plurality of RBs are collectively referred to as an RBG (RB Group). Whether the RBG is defined by how many RBs is different depending on contents of processing.

The radio terminal 11 will be described. Also, the radio terminal 12 has the same function as that of the radio terminal 11, and therefore, their descriptions will not be repeated.

Figure 8:
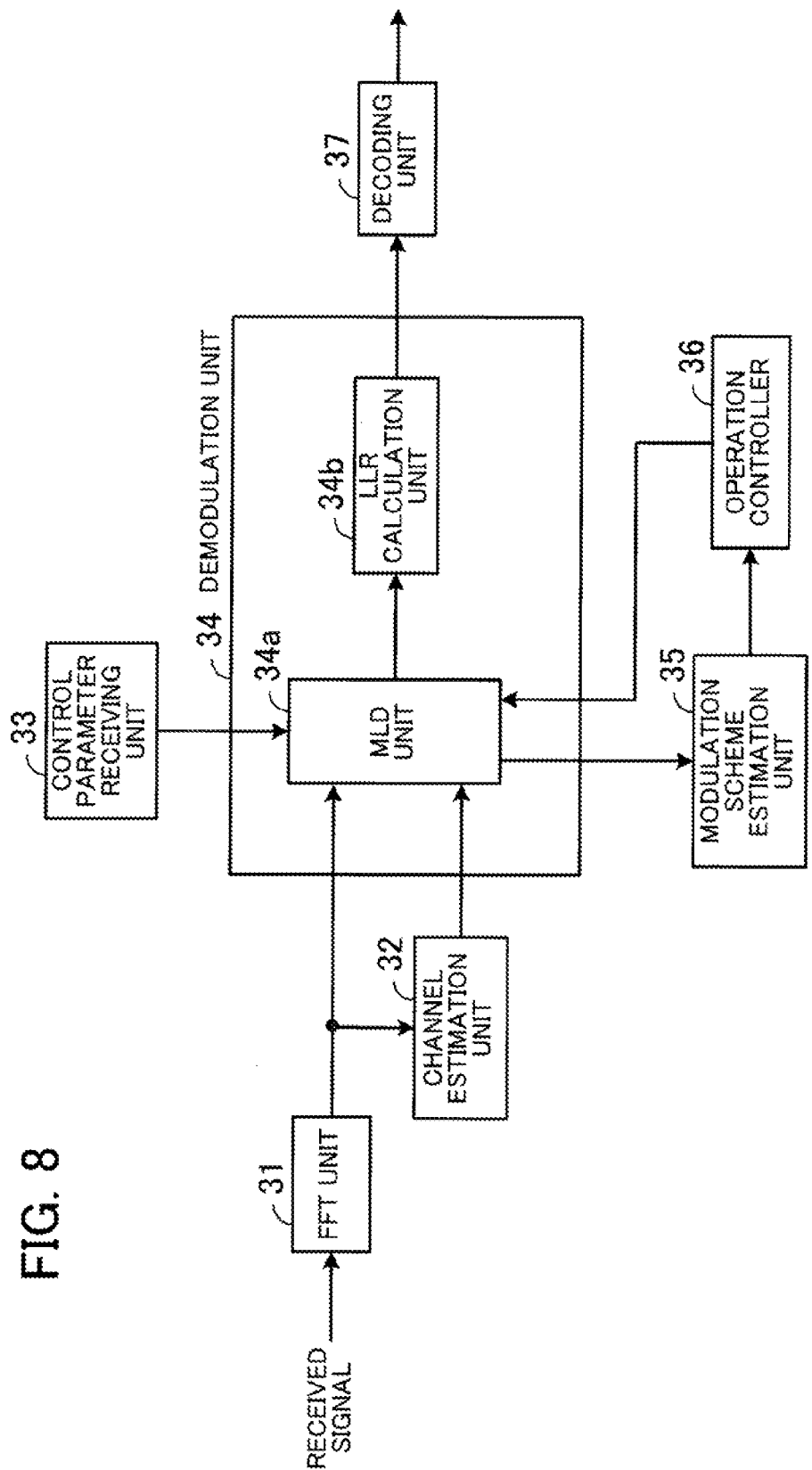
FIG. 8 is a block diagram illustrating a radio terminal.

FIG. 8 is a block diagram illustrating the radio terminal. As illustrated in FIG. 8, the radio terminal 11 has an FFT (Fast Fourier Transform) unit 31, a channel estimation unit 32, a control parameter receiving unit 33, a demodulation unit 34, a modulation scheme estimation unit 35, an operation controller 36, and a decoding unit 37.

To the FFT unit 31, signals of the time domain received by a receiving antenna are supplied. The FFT unit 31 performs FFT processing of the supplied signals, and converts them into signals of the frequency domain.

To the channel estimation unit 32, pilot signals converted into the frequency domain by the FFT unit 31 are supplied. The channel estimation unit 32 estimates (calculates) a channel value of a propagation path in the DL based on the supplied pilot signals. For example, the channel estimation unit 32 performs cancellation processing of the pilot signals, and calculates a channel value of the propagation path in the DL.

The control parameter receiving unit 33 receives the control parameter from the base station 13. The control parameter includes information on the modulation scheme applied to the transmitted signal to the radio terminal 11. For example, when the modulation scheme of 16 QAM is applied to signals to the radio terminal 11, the control parameter includes information to the effect that the modulation scheme of 16 QAM is applied. The control parameter receiving unit 33 supplies information on the modulation scheme included in the control parameter to the demodulation unit 34.

The demodulation unit 34 has an MLD unit 34a and an LLR (Log Likelihood Ratio) calculation unit 34b.

To the MLD unit 34a, signals converted into the frequency domain by the FFT unit 31 and channel values estimated by the channel estimation unit 32 are supplied.

To the MLD unit 34a, information on the modulation scheme received by the control parameter receiving unit 33 is further supplied. Specifically, to the MLD unit 34a, information on the modulation scheme applied to signals to the radio terminal 11 is supplied.

The MLD unit 34a performs MLD by using the modulation scheme notified by the base station 13 and the plurality of the modulation schemes applicable to signals to the other radio terminal 12.

Figure 9:
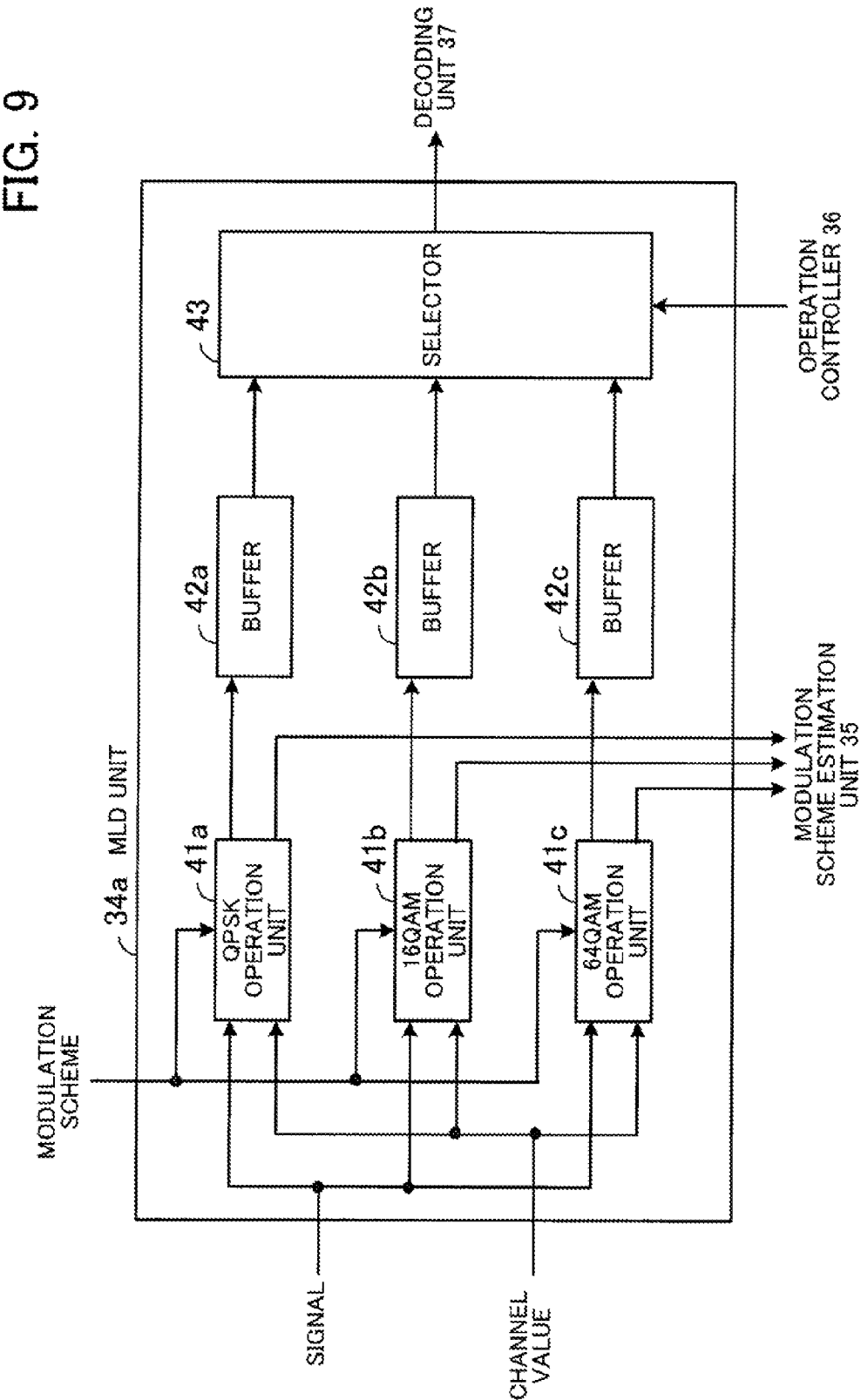
FIG. 9 is a block diagram illustrating an MLD unit.

FIG. 9 is a block diagram illustrating the MLD unit. As illustrated in FIG. 9, the MLD unit 34a has a QPSK operation unit 41a, a 16 QAM operation unit 41b, a 64 QAM operation unit 41c, buffers 42a to 42c, and a selector 43.

To each of the QPSK operation unit 41a, the 16 QAM operation unit 41b, and the 64 QAM operation unit 41c, signals produced from the FFT unit 31 and channel values estimated by the channel estimation unit 32 are supplied.

To each of the QPSK operation unit 41a, the 16 QAM operation unit 41b, and the 64 QAM operation unit 41c, information on the modulation scheme produced from the control parameter receiving unit 33 is further supplied. Specifically, to each of the QPSK operation unit 41a, the 16 QAM operation unit 41b, and the 64 QAM operation unit 41c, information on the modulation scheme applied to signals to the radio terminal 11 is supplied.

The QPSK operation unit 41a generates replicas by using the modulation scheme based on information on the supplied modulation scheme and the modulation scheme QPSK. The QPSK operation unit 41a considers (considers an effect of the propagation path) a channel value produced from the channel estimation unit 32 for the generated replicas. For example, the QPSK operation unit 41a changes amplitude or rotates the generated replica based on the channel value. The QPSK operation unit 41a calculates distances between the replicas for which the channel value is considered and the signals (symbols) produced from the FFT unit 31.

Suppose, for example, that the modulation scheme of the supplied information is 16 QAM. In this case, the QPSK operation unit 41a generates 16×4 replicas. The QPSK operation unit 41a calculates distances between the 16×4 replicas for which the channel value is considered and the symbols produced from the FFT unit 31.

The 16 QAM operation unit 41b generates replicas by using the modulation scheme based on information on the supplied modulation scheme and the modulation scheme 16 QAM. The 16 QAM operation unit 41b considers a channel value produced from the channel estimation unit 32 for the generated replicas. The 16 QAM operation unit 41b calculates distances between the replicas for which the channel value is considered and symbols produced from the FFT unit 31.

Suppose, for example, that the modulation scheme of the supplied information is 16 QAM. In this case, the 16 QAM operation unit 41b generates 16×16 replicas. The 16 QAM operation unit 41b calculates distances between the 16×16 replicas for which the channel value is considered and the symbols produced from the FFT unit 31.

The 64 QAM operation unit 41c generates replicas by using the modulation scheme based on information on the supplied modulation scheme and the modulation scheme 64 QAM. The 64 QAM operation unit 41c considers a channel value produced from the channel estimation unit 32 for the generated replicas. The 64 QAM operation unit 41c calculates distances between the replicas for which the channel value is considered and the symbols produced from the FFT unit 31.

Suppose, for example, that the modulation scheme of the supplied information is 16 QAM. In this case, the 64 QAM operation unit 41c generates 16×64 replicas. The 64 QAM operation unit 41c calculates distances between the 16×64 replicas for which the channel value is considered and the symbols produced from the FFT unit 31.

That is, the QPSK operation unit 41a, the 16 QAM operation unit 41b, and the 64 QAM operation unit 41c each perform MLD by using the plurality of modulation schemes applicable to the other multiplexed radio terminal 12. Specifically, the QPSK operation unit 41a, the 16 QAM operation unit 41b, and the 64 QAM operation unit 41c each perform MLD by using each modulation scheme assuming that the modulation scheme such as QPSK, 16 QAM, or 64 QAM is applied to the other multiplexed radio terminal 12.

The QPSK operation unit 41a, the 16 QAM operation unit 41b, and the 64 QAM operation unit 41c each calculate distances for each RE.

In the case where other modulation schemes are applied to signals received by the radio terminal 12, operation units corresponding to the modulation schemes are provided. Suppose, for example, that modulation schemes such as QPSK, 16 QAM, 64 QAM, 128 QAM, and 256 QAM are applicable to the radio terminal 12. In this case, the MLD unit 34a has a 128 QAM operation unit and a 256 QAM operation unit in addition to the operation units illustrated in FIG. 9.

The QPSK operation unit 41a, the 16 QAM operation unit 41b, and the 64 QAM operation unit 41c each supply calculated distances to the buffers 42a to 42c. For example, the QPSK operation unit 41a supplies 16×4 distances calculated for each RE to the buffer 42a.

The QPSK operation unit 41a, the 16 QAM operation unit 41b, and the 64 QAM operation unit 41c each supply predetermined information obtained in an MLD process stage to the modulation scheme estimation unit 35. Examples of the predetermined information obtained in the MLD process stage include a minimum cumulative distance.

The minimum cumulative distance is a minimum value among the cumulative distances relating to all possible transmitted signals. The cumulative distance is obtained by accumulating, over all of the receiving antennas, a distance between a received signal for each receiving antenna and a replica for a transmitted signal. Suppose, for example, that the radio terminals 11 and 12, and the base station 13 perform 2×2 MIMO communication. A distance between a received signal and a replica for a transmitted signal is supposed to be $D1(x1, x2)$ at the time of receiving, by a receiving antenna 1 of the radio terminal 11, a symbol x1 transmitted by a transmitting antenna 1 of the base station 13 and a symbol x2 transmitted by a transmitting antenna 2 of the base station 13. A distance between a received signal and a replica for a transmitted signal is supposed to be $D2(x1, x2)$ at the time of receiving, by a receiving antenna 2 of the radio terminal 11, a symbol X1 transmitted by the transmitting antenna 1 of the base station 13 and a symbol X2 transmitted by the transmitting antenna 2 of the base station 13. In this case, the cumulative distance in the case where a pair of x1 and x2 of the transmitted symbol is transmitted is $D1(x1, x2)+D2(x1, x2)$. In the same manner, cumulative distances relating to pairs of all possible transmitted signals are calculated. Among the cumulative distances, a minimum value is used as the minimum cumulative distance.

The QPSK operation unit 41a, the 16 QAM operation unit 41b, and the 64 QAM operation unit 41c each calculate the minimum cumulative distance based on the calculated distances. The minimum cumulative distance is further calculated for each RE. A combination of symbols as the minimum cumulative distance is estimated to be a combination of transmitted symbols with a highest likelihood.

Each of the buffers 42a to 42c temporarily stores distance information (for example, a distance, minimum distance, and minimum cumulative distance between a symbol and a replica) produced from each of the QPSK operation unit 41a, the 16 QAM operation unit 41b, and the 64 QAM operation unit 41c. The distance information is calculated for each RE, and stored in the buffers 42a to 42c.

Under the control of the operation controller 36, the selector 43 supplies the distance information stored in any of the buffers 42a to 42c to the LLR calculation unit 34b.

Suppose, for example, that the modulation scheme of the other radio terminal 12 is estimated to be 16 QAM by the after-mentioned modulation scheme estimation unit 35. In this case, under the control of the operation controller 36, the selector 43 supplies the distance information stored in the buffer 42b to the LLR calculation unit 34b.

Returning to FIG. 8, the modulation scheme estimation unit 35 estimates a modulation scheme applied to signals to the other radio terminal 12 based on predetermined information (for example, information on a distance) obtained in the MLD process stage in each of QPSK, 16 QAM, and 64 QAM as the plurality of modulation schemes of the MLD unit 34a.

For example, the modulation scheme estimation unit 35 calculates a metric from the minimum cumulative distances obtained in the MLD process stage in each of the plurality of the modulation schemes of the MLD unit 34a. In the metric, for example, the minimum cumulative distances are averaged by the predetermined number of REs and then multiplied by a predetermined coefficient. Based on the calculated metric, the modulation scheme estimation unit 35 estimates a modulation scheme applied to signals to the other radio terminal 12.

Figure 10:
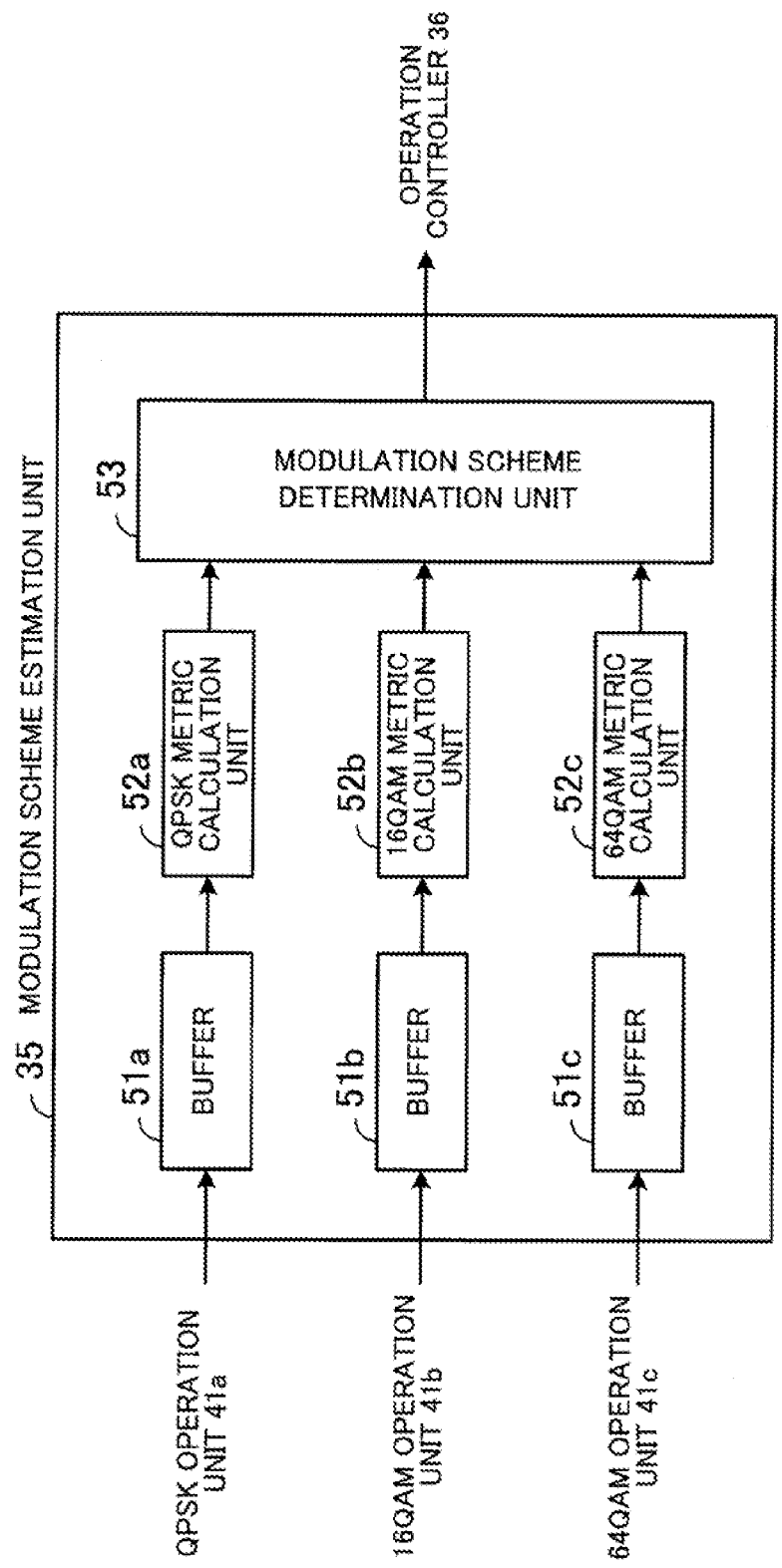
FIG. 10 is a block diagram illustrating a modulation scheme estimation unit.

FIG. 10 is a block diagram illustrating the modulation scheme estimation unit. As illustrated in FIG. 10, the modulation scheme estimation unit 35 has buffers 51a to 51c, a QPSK metric calculation unit 52*a*, a 16 QAM metric calculation unit 52*b*, a 64 QAM metric calculation unit 52*c*, and a modulation scheme determination unit 53.

To the buffer 51*a*, predetermined information obtained in the MLD process stage of the QPSK operation unit 41*a* illustrated in FIG. 9 is supplied. To the buffer 51*b*, predetermined information obtained in the MLD process stage of the 16 QAM operation unit 41*b* is supplied. To the buffer 51*c*, predetermined information obtained in the MLD process stage of the 64 QAM operation unit 41*c* is supplied. Examples of the predetermined information include the minimum cumulative distance calculated for each RE. The buffers 51*a* to 51*c* temporarily store the minimum cumulative distances of the predetermined number of REs.

Based on the predetermined information obtained in the MLD process stage of the QPSK operation unit 41*a* stored in the buffer 51*a*, the QPSK metric calculation unit 52*a* calculates a metric as an indicator for estimating that the other radio terminal 12 uses the QPSK. For example, the QPSK metric calculation unit 52*a* calculates a metric based on the minimum cumulative distance calculated by the QPSK operation unit 41*a* stored in the buffer 51*a*. For example, the metric is obtained by adding a plurality of the minimum cumulative distances stored in the buffer 51*a* together and multiplying it by a predetermined coefficient.

Based on the predetermined information obtained in the MLD process stage of the 16 QAM operation unit 41*b* stored in the buffer 51*b*, the 16 QAM metric calculation unit 52*b* calculates a metric as an indicator for estimating that the other radio terminal 12 uses the 16 QAM. For example, the 16 QAM metric calculation unit 52*b* calculates a metric based on the minimum cumulative distance calculated by the 16 QAM operation unit 41*b* stored in the buffer 51*b*. For example, the metric is obtained by adding a plurality of the minimum cumulative distances stored in the buffer 51*b* together and multiplying it by a predetermined coefficient.

Based on the predetermined information obtained in the MLD process stage of the 64 QAM operation unit 41*c* stored in the buffer 51*c*, the 64 QAM metric calculation unit 52*c* calculates a metric as an indicator for estimating that the other radio terminal 12 uses 64 QAM. For example, the 64 QAM metric calculation unit 52*c* calculates a metric based on the minimum cumulative distance calculated by the 64 QAM operation unit 41*c* stored in the buffer 51*c*. For example, the metric is obtained by adding a plurality of the minimum cumulative distances stored in the buffer 51*c* together and multiplying it by a predetermined coefficient.

In addition, in the case where other modulation schemes are applied to the radio terminal 12, calculation units corresponding to them are provided. Suppose, for example, that modulation schemes such as QPSK, 16 QAM, 64 QAM, 128 QAM, and 256 QAM are applicable to the radio terminal 12. In this case, the modulation scheme estimation unit 35 has a 128 QAM metric calculation unit and a 256 QAM metric calculation unit in addition to the calculation units illustrated in FIG. 10. The modulation scheme estimation unit 35 further has two buffers corresponding to the 128 QAM metric calculation unit and the 256 QAM metric calculation unit in addition to the buffers illustrated in FIG. 10.

The modulation scheme determination unit 53 estimates a modulation scheme applied to the other radio terminal 12 based on the metric calculated by each of the QPSK metric calculation unit 52*a*, the 16 QAM metric calculation unit 52*b*, and the 64 QAM metric calculation unit 52*c*.

For example, the modulation scheme determination unit 53 estimates the modulation scheme of the radio terminal 12 based on a size of the metric. For example, when a metric produced from the 16 QAM metric calculation unit 52*b* is smallest, the modulation scheme determination unit 53 estimates that the modulation scheme of the radio terminal 12 is 16 QAM.

That is, for example, the smallest minimum cumulative distance is produced from any of the QPSK operation unit 41*a*, 16 QAM operation unit 41*b*, and 64 QAM operation unit 41*c* of the MLD unit 34*a* matched with the modulation scheme of the radio terminal 12. For example, when the modulation scheme of the radio terminal 12 is supposed to be 16 QAM, the minimum cumulative distance produced from the 16 QAM operation unit 41*b* is smaller than the minimum cumulative distances produced from the other operation units. Also, a value of the metric calculated based on the minimum cumulative distance is small. Through the process, the modulation scheme of the radio terminal 12 is, for example, estimated to be 16 QAM. The metric is multiplied by a predetermined coefficient to adjust the weight of the determination of the estimation; further, this will be described later.

Returning to FIG. 8, the operation controller 36 controls the MLD unit 34*a* to perform MLD by using the modulation scheme received by the control parameter receiving unit 33 and the modulation scheme estimated by the modulation scheme estimation unit 35.

For example, the operation controller 36 controls the selector 43 to supply distance information of the operation unit corresponding to the modulation scheme estimated by the modulation scheme estimation unit 35 to the LLR calculation unit 34*b* from among the buffers 42*a* to 42*c* which store the distance information of each operation unit illustrated in FIG. 9. Suppose, for example, that the modulation scheme of the radio terminal 12 is estimated to be 16 QAM by the modulation scheme estimation unit 35. In this case, the operation controller 36 controls the selector 43 to supply the distance information stored in the buffer 42*b* to the LLR calculation unit 34*b*.

The LLR calculation unit 34*b* calculates an LLR based on the distance information produced from the MLD unit 34*a*.

The decoding unit 37 decodes a received signal based on the LLR produced from the LLR calculation unit 34*b*.

Operations of the radio terminal 11 will be described below with reference to expressions.

A signal point A is supposed to be transmitted to the radio terminal 11 from the transmitting antenna 2 of the base station 13, and a signal point B is supposed to be transmitted to the radio terminal 12 from the transmitting antenna 1 of the base station 13. Suppose further that in the radio terminal 11, a received signal vector is set as y, a channel matrix is set as H, and a noise vector is set as n. A relationship between the transmitted signal and the received signal may be represented by the following expressions (1a) and (1b).

$$y = H \begin{pmatrix} B \\ A \end{pmatrix} + n \tag{1a}$$

$$\begin{pmatrix} y_1 \\ y_2 \end{pmatrix} = \begin{pmatrix} h_{11} & h_{12} \\ h_{21} & h_{22} \end{pmatrix} \begin{pmatrix} B \\ A \end{pmatrix} + \begin{pmatrix} n_1 \\ n_2 \end{pmatrix} \tag{1b}$$

A value of the channel matrix H is obtained from the channel estimation unit 32.

The QPSK operation unit 41*a*, 16 QAM operation unit 41*b*, and 64 QAM operation unit 41*c* of the radio terminal 11 (hereinafter, these may be simply referred to as operation units) calculate metrics for estimating the modulation scheme of the radio terminal 12. For that purpose, QPSK, 16 QAM, and 64 QAM are supposed as the modulation scheme of the radio terminal 12, and the MLD is performed for them, respectively. As the MLD, a Full-MLD may be used, or a MLD using QR decomposition may be used. Hereinafter, an example of the MLD using the QR decomposition will be described.

For the purpose of performing the QR decomposition of the channel matrix, the received signal vector and the channel matrix are multiplied by $Q^H$. As a result, the received signal vector and the channel matrix are represented by the following expressions (2a) and (2b), respectively.

$$Q^H y = z \tag{2a}$$

$$Q^H H = Q^H QR = R \tag{2b}$$

Q denotes a unitary matrix, $Q^H$ denotes a unitary matrix obtained by subjecting a unitary matrix to Hermitian transposition, and R denotes an upper triangular matrix.

Each operation unit uses the received signal vector z and upper triangular matrix R calculated as described above. Each operation unit calculates a distance between the received signal vector and the replica in each of the modulation schemes such as QPSK, 16 QAM, and 64 QAM applicable to the radio terminal 12. In each of the modulation schemes such as QPSK, 16 QAM, and 64 QAM applicable to the radio terminal 12, each operation unit further selects a pair of signal points in which the cumulative distance is minimized, as follows.

$\tilde{A}_{QPSK}, \tilde{B}_{QPSK}$
$\tilde{A}_{16QAM}, \tilde{B}_{16QAM}$
$\tilde{A}_{64QAM}, \tilde{B}_{64QAM}$ A top pair of signal points is a signal point to the radio terminal 11 and that to the radio terminal 12 in which the cumulative distance is minimized and in which the modulation scheme of the radio terminal 12 is supposed to be QPSK and calculated. A second pair of signal points from the top is a signal point to the radio terminal 11 and that to the radio terminal 12 in which the cumulative distance is minimized and in which the modulation scheme of the radio terminal 12 is supposed to be 16 QAM and calculated. A bottommost pair of signal points is a signal point to the radio terminal 11 and that to the radio terminal 12 in which the cumulative distance is minimized and in which the modulation scheme of the radio terminal 12 is supposed to be 64 QAM and calculated.

The minimum cumulative distance of a pair of signal points in each modulation scheme as described above is represented based on the following expression (3) by expressions (3a) to (3c).

$$\left\| y - H \begin{pmatrix} \tilde{B} \\ \tilde{A} \end{pmatrix} \right\|^2 = \left\| z - R \begin{pmatrix} \tilde{B} \\ \tilde{A} \end{pmatrix} \right\|^2 \tag{3}$$

$$d_{QPSK} = \left| z_1 - r_{11} \tilde{B}_{QPSK} - r_{12} \tilde{A}_{QPSK} \right|^2 + \left| z_2 - r_{22} \tilde{A}_{QPSK} \right|^2 \tag{3a}$$

$$d_{16QAM} = \left| z_1 - r_{11} \tilde{B}_{16QAM} - r_{12} \tilde{A}_{16QAM} \right|^2 + \left| z_2 - r_{22} \tilde{A}_{16QAM} \right|^2 \tag{3b}$$

$$d_{64QAM} = \left| z_1 - r_{11} \tilde{B}_{64QAM} - r_{12} \tilde{A}_{64QAM} \right|^2 + \left| z_2 - r_{22} \tilde{A}_{64QAM} \right|^2 \tag{3c}$$

A first term of a right side of each of the expressions (3a) to (3c) represents a distance between a received signal and the replica of a transmitted signal at the time when a symbol B transmitted by the transmitting antenna 1 of the base station 13 and a symbol A transmitted by the transmitting antenna 2 thereof are received by using the receiving antenna 1 of the radio terminal 11.

A second term thereof represents a distance between a received signal and a replica of a transmitted signal at the time when the symbol B transmitted by the transmitting antenna 1 of the base station 13 and the symbol A transmitted by the transmitting antenna 2 thereof are received by using the receiving antenna 2 of the radio terminal 11.

The operation units each perform the above processing for each RE. Specifically, the operation units each calculate distances between the received signal vectors and the replicas by using the QR decomposition for each RE, and supply them to the buffers 42a to 42c illustrated in FIG. 9, respectively. The operation units each calculate the minimum cumulative distances for each RE, and supply them to the buffers 51a to 51c illustrated in FIG. 10, respectively.

The QPSK metric calculation unit 52a, 16 QAM metric calculation unit 52b, and 64 QAM metric calculation unit 52c illustrated in FIG. 10 (hereinafter, these may be simply referred to as calculation units) calculate metrics based on the minimum cumulative distances stored in the buffers 51a to 51c, respectively.

For example, when the minimum cumulative distances relating to $N_{ave}$ pieces of REs are stored in the buffers 51a to 51c, each calculation unit averages them. For example, each calculation unit totals $N_{ave}$ pieces of the minimum cumulative distances stored in the buffers 51a to 51c, and divides it by $N_{ave}$. Each calculation unit multiplies the averaged minimum cumulative distance by a predetermined coefficient to calculate the metric.

The metrics calculated by the operation units are represented by the following expressions (4a) to (4c).

$$\bar{d}_{QPSK} = C_{QPSK} \sum_{l=1}^{N_{ave}} d_{QPSK}(l) \tag{4a}$$

$$\bar{d}_{16QAM} = C_{16QAM} \sum_{l=1}^{N_{ave}} d_{16QAM}(l) \tag{4b}$$

$$\bar{d}_{64QAM} = C_{64QAM} \sum_{l=1}^{N_{ave}} d_{64QAM}(l) \tag{4c}$$

In the expression (4a), for example, $N_{ave}$ pieces of the minimum cumulative distances of QPSK represented by the expression (3a) are totaled and multiplied by a coefficient $C_{QPSK}$. In the expressions (4a) to (4c), the totaled minimum cumulative distances are not divided by $N_{ave}$. Each metric represented by the expressions (4a) to (4c) represents an indicator for estimating the modulation scheme applied to the radio terminal 12 and, even if each metric is divided by the same $N_{ave}$, the indicator is unchanged.

The $N_{ave}$ pieces of REs to be averaged may be the number of pieces in one certain symbol, or the number of pieces over a plurality of symbols.

Coefficients $C_{QPSK}$, $C_{16QAM}$, and $C_{64QAM}$ by which the expressions (4a) to (4c) are multiplied are weights to be hard to estimate the modulation scheme applied to the radio terminal 12. As a value of the coefficient is larger, the modulation scheme multiplied by that coefficient is harder to be estimated by the modulation scheme determination unit 53.

Suppose, for example, that values of the coefficients $C_{QPSK}$, $C_{16QAM}$, and $C_{64QAM}$ are 1.0, 1.0, and 2.0, respectively. In this case, even if the averaged minimum cumulative distance of 64 QAM is smaller than the averaged minimum cumulative distances of the other modulation schemes, it is multiplied by the coefficient 2.0. Through the process, when the metric of 64 QAM is larger than those of the other modulation schemes, 64 QAM fails to be estimated by the modulation scheme determination unit 53.

For example, as a level of a multi-level modulation scheme is larger, a larger value is set as a value of the coefficient. The reason comes from the following facts: as a level of the multi-level modulation scheme is larger, a density of the replica is larger. Further, a distance between the replica and the signal point becomes small depending on noises, and as a result, the multi-level modulation scheme is easy to be estimated. Of course, when a value of the coefficient is excessively large, the multi-level modulation scheme fails to be estimated, and therefore an appropriate value is set as the coefficient value. For example, even if the coefficient has predetermined noises, a simulation is performed to determine the coefficient so that an appropriate modulation scheme may be estimated and a desired BER may be obtained.

For example, the modulation scheme determination unit 53 estimates a modulation scheme so that the metric calculated by each operation unit may be minimized. For example, the modulation scheme determination unit 53 estimates the modulation scheme applied to the radio terminal 12 through the following expression (5).

$$\mathrm{mod}_{est} = \underset{mod}{\mathrm{argmin}}\{\bar{d}_{QPSK}, \bar{d}_{16QAM}, \bar{d}_{64QAM}\} \quad (5)$$

Hereinafter, the BER of the radio terminal 11 will be described.

Figure 11:
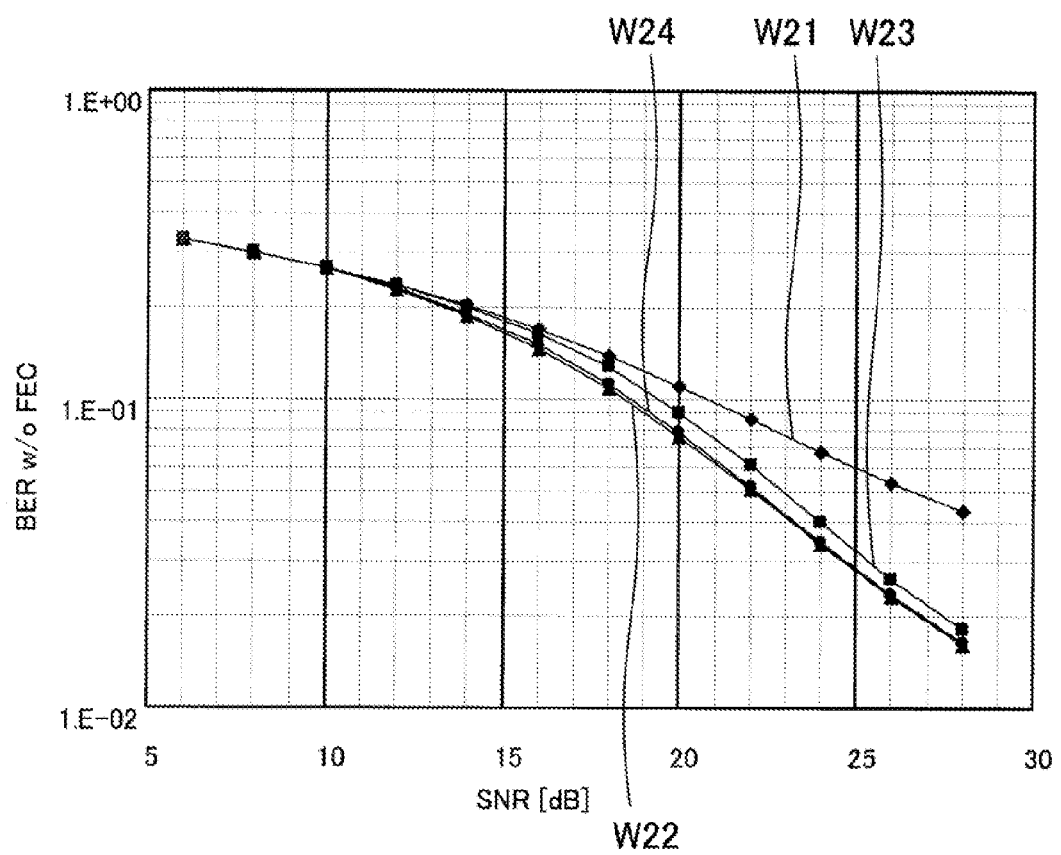
FIG. 11 illustrates a BER of a radio terminal.

FIG. 11 illustrates the BER of the radio terminal. The horizontal axis of FIG. 11 represents the SNR [dB], and the vertical axis represents the error rate.

A curve W21 illustrated in FIG. 11 indicates an error rate in the case where a received signal is demodulated by using an MMSE in the radio terminal using the MU-MIMO mode.

A curve W22 indicates an error rate in the case where the modulation scheme of the other radio terminal is 16 QAM is notified and a received signal is demodulated by using the MLD in the radio terminal using the MU-MIMO mode.

A curve W23 indicates an error rate in the case where the minimum cumulative distances are averaged with the number of REs of one RB in one head symbol of the data area, and values of the Coefficients $C_{QPSK}$, $C_{16QAM}$, and $C_{64QAM}$ are set to 1.0, 1.0, and 1.4, respectively, in the radio terminal 11. Note that the modulation scheme of 16 QAM is supposed to be applied to the other radio terminal 12.

A curve W24 indicates an error rate in the case where the minimum cumulative distances are averaged with the number of REs of one RB in one head symbol of the data area, and values of the Coefficients $C_{QPSK}$, $C_{16QAM}$, and $C_{64QAM}$ are set to 1.0, 1.0, and 2.0, respectively, in the radio terminal 11. Note that the modulation scheme of 16 QAM is supposed to be applied to the other radio terminal 12.

As illustrated in the curves W23 and W24, an error rate of the radio terminal 11 which estimates the modulation scheme of the other radio terminal 12 and performs MLD is lower than the MMSE illustrated in the curve W21.

As illustrated in the curves W22 and W24, when setting an appropriate coefficient, the radio terminal 11 obtains an error rate with the same level as that of the error rate in the case where the modulation scheme of the other radio terminal is 16 QAM is notified and a received signal is demodulated by using MLD.

As can be seen from the above sequence, the radio terminal 11 receives the modulation scheme applied to signals to its own and performs MLD by using the received modulation scheme and the plurality of modulation schemes applicable to the other radio terminal 12. Based on predetermined information obtained in the MLD process stage in each of the plurality of modulation schemes in the MLD unit 34a, the radio terminal 11 then estimates the modulation scheme applied to signals to the other radio terminal 12. As a result, even if the modulation scheme of the other multiplexed radio terminal 12 is not notified, the radio terminal 11 demodulates the received signal.

The radio terminal 11 further calculates the metric in which a weight is added to predetermined information, and estimates the modulation scheme applied to signals to the other radio terminal 12 by using the calculated metric. Through the process, the radio terminal 11 appropriately estimates the modulation scheme applied to signals to the other radio terminal 12.

In the above, an example of calculating a metric based on the minimum cumulative distance is illustrated; however, it is not limited thereto. For example, the metric may be calculated based on the minimum distance. For example, based on the minimum distance represented by the first term of the expressions (3a) to (3c) or the minimum distance represented by the second term, the metric may be calculated. That is, a metric may be calculated based on the minimum distance between a received signal received by a certain receiving antenna and a replica of a transmitted signal.

Third Embodiment

Next, a third embodiment will be described in detail with reference to the accompanying drawings. In the third embodiment, modulation schemes of the other radio terminals are estimated by using predetermined information obtained in a maximum likelihood detection process in a predetermined area from a head of a data area of radio resources. An assignment of the radio resources will be first described.

Figure 12:
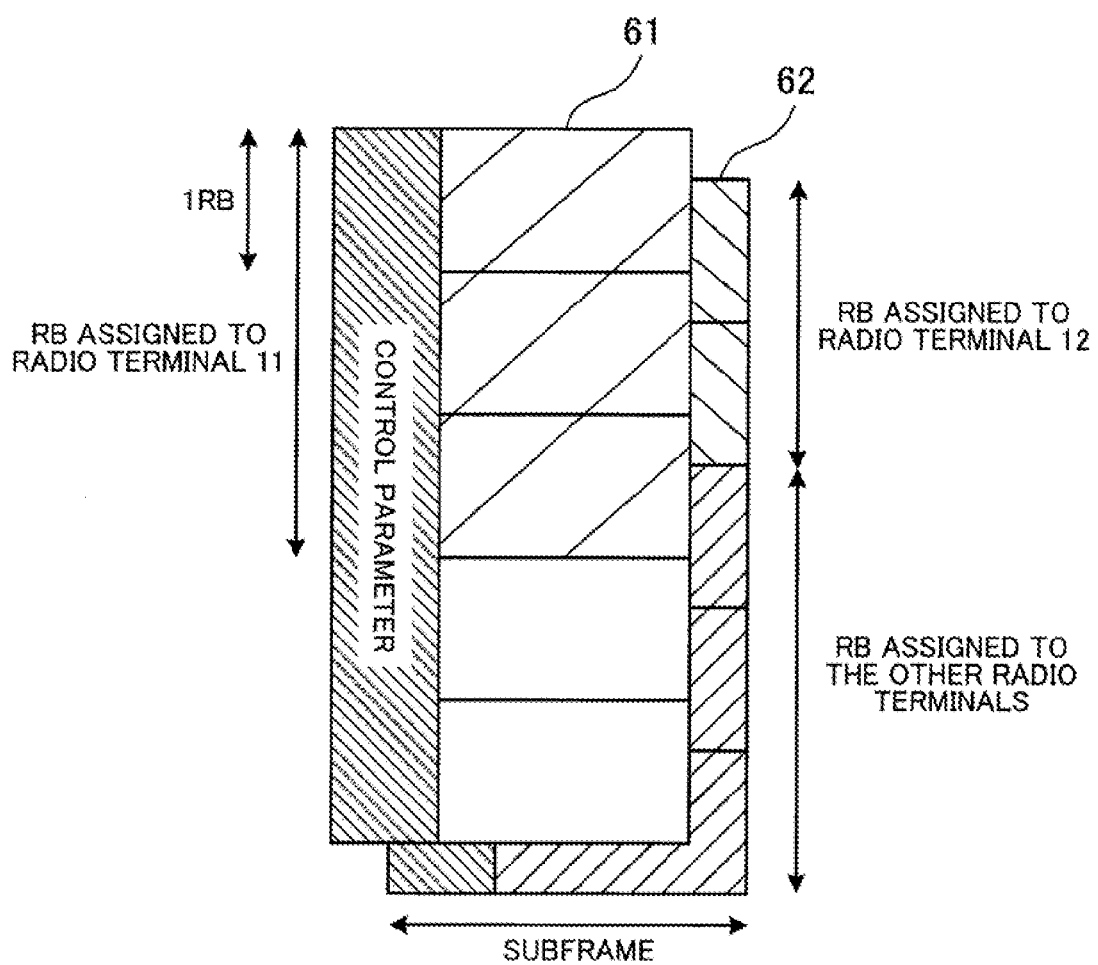
FIG. 12 illustrates assignment of radio resources.

FIG. 12 illustrates an assignment of the radio resources. The radio resource 61 illustrated in FIG. 12 illustrates radio resources assigned to data transmitted by the transmitting antenna 1 of the base station 13. The radio resource 62 illustrates radio resources assigned to data transmitted by the transmitting antenna 2 of the base station 13.

As illustrated in FIG. 12, several symbols from the head of the subframe are used for transmitting the control parameter, and the remaining symbols are used for the data transmission. Hereinafter, an area used for transmitting the control parameters of the radio resources 61 and 62 may be referred to as a control area, and an area used for the data transmission may be referred to as a data area.

In the LTE and LTE-A systems, the data assignment is performed in a subframe unit in the time direction and in an RB unit in the frequency direction. Accordingly, the radio terminals 11 and 12 multiplexed in the MU-MIMO mode are different from each other in each subframe and RB. Also, the modulation scheme is different from each other in each subframe and RB.

In FIG. 12, for example, the radio terminal 11 is assigned to three RBs of the radio resource 61 for the transmitting antenna 1. The radio terminal 12 is further assigned to two RBs of the radio resource 62 for the transmitting antenna 2. The other radio terminals (hereinafter, these may be referred to as a radio terminal A) are further assigned to three RBs of the radio resource 62 for the transmitting antenna 2.

The demodulation of data is performed by the RE of the head symbol of the data area. Therefore, the demodulation of data fails to be started until the estimation of the modulation schemes of the other multiplexed radio terminals 12 and A is completed.

To cope with the above problem, the radio terminal 11 according to the third embodiment estimates the modulation schemes of the other radio terminals 12 and A by using data in the predetermined area from the head of the data area. Specifically, based on the predetermined information obtained in the MLD process stage of the data in the predetermined area from the head of the data area, the radio terminal 11 estimates the modulation schemes applied to signals to the other radio terminals 12 and A. The radio terminal 11 then demodulates data behind in the time direction by using the estimated modulation scheme.

In the estimation processing of the modulation scheme, as described in the second embodiment, for example, the MLD is performed assuming the plurality of modulation schemes, and the distance information is stored in the corresponding buffers 42a to 42c for each modulation scheme. Accordingly, even if any modulation scheme is applied to the other radio terminals 12 and A, the distance information is already obtained with regard to the REs for use in the estimation of the modulation scheme. Therefore, the radio terminal 11 fails to freshly perform MLD at steps of the demodulation processing with regard to those REs.

In FIG. 12, the radio terminal 11 estimates the modulation scheme of the RB assigned to its own and the modulation schemes of the other multiplexed radio terminals 12 and A. For example, the radio terminal 11 estimates the modulation schemes of two RBs assigned to the radio terminal 12, and the modulation scheme of a top RB of three RBs assigned to the radio terminal A.

Figure 13:
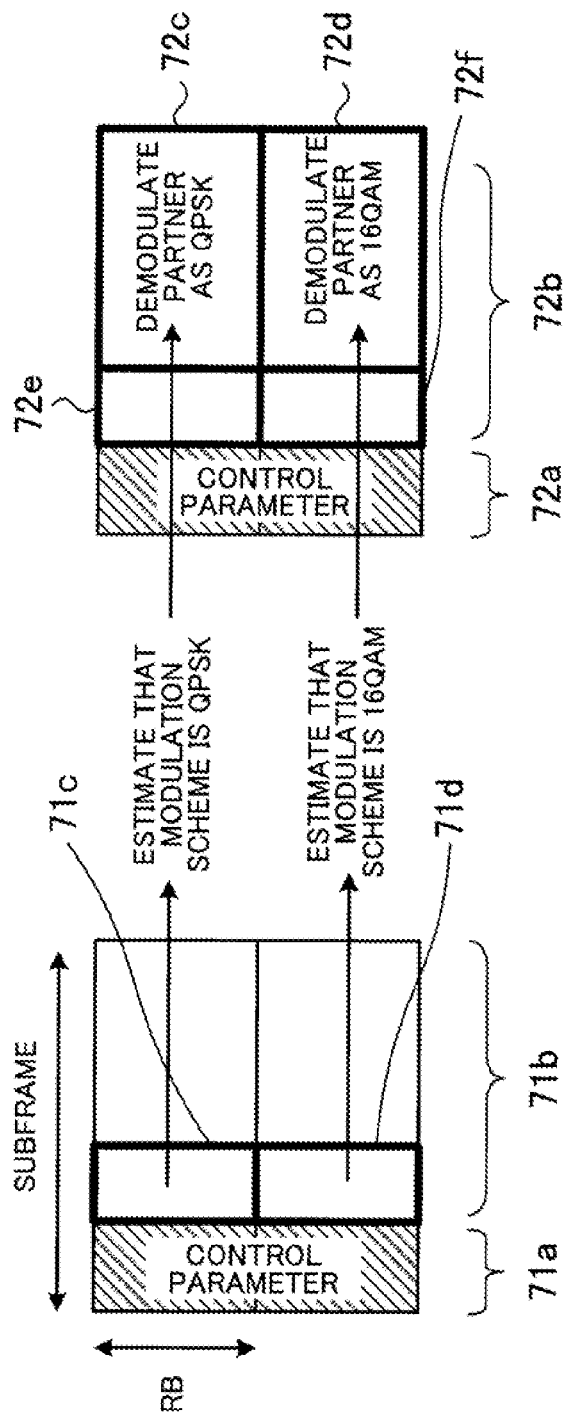
FIG. 13 illustrates estimation and demodulation of a modulation scheme according to a third embodiment.

FIG. 13 illustrates estimation and demodulation of the modulation scheme according to the third embodiment. A block diagram of the radio terminal 11 according to the third embodiment is illustrated in the same manner as in FIGS. 8 to 10. Note that the after-mentioned portions are different from those of FIGS. 8 to 10.

In FIG. 13, radio resources assigned to the radio terminal 11 are illustrated. The radio resource illustrated in the left side of FIG. 13 illustrates radio resources at step of estimating the modulation schemes of the other radio terminals 12 and A. The radio resource illustrated in the right side thereof illustrates radio resources at steps of demodulating the data.

Areas 71a and 72a illustrated in FIG. 13 represent control areas. Areas 71b and 72b represent data areas.

As illustrated in frames 71c and 71d of the radio resources illustrated in the left side of FIG. 13, the modulation scheme estimation unit 35 of the radio terminal 11 estimates the modulation schemes of the other radio terminals 12 and A in an RB unit. The modulation scheme estimation unit 35 estimates the modulation schemes of the other radio terminals 12 and A based on the predetermined information obtained in the MLD process stage of the data in the determined area (area of the predetermined symbols) from the head of the data area.

Based on the predetermined information obtained in the MLD process stage of all or part of the REs in the frame 71c, for example, the modulation scheme estimation unit 35 estimates that the modulation scheme of the other radio terminal 12 is QPSK. Based on the predetermined information obtained in the MLD process stage of all or part of the REs in the frame 71d, the modulation scheme estimation unit 35 further estimates that the modulation scheme of the other radio terminal A is 16 QAM.

The demodulation unit 34 demodulates data not used for estimating the modulation scheme by using the estimated modulation scheme. For example, the demodulation unit 34 demodulates data illustrated in the frame 72c of the radio resources illustrated in the right side of FIG. 13 by using the estimated modulation scheme QPSK. The demodulation unit 34 further demodulates data illustrated in the frame 72d by using the estimated modulation scheme 16 QAM. Frames 72e and 72f represent data areas used for estimating the modulation scheme, and correspond to the frames 71c and 71d.

In the data of the frames 72e and 72f, during the estimation processing of the modulation scheme, distance information is calculated by using the QPSK operation unit 41a, the 16 QAM operation unit 41b, and the 64 QAM operation unit 41c. The calculated distance information is stored in the buffers 42a to 42c. Accordingly, the demodulation unit 34 eliminates the need to perform MLD of the data in the frames 72e and 72f.

In the case where data is assigned not in an RB unit but in an RBG unit, the modulation scheme may be estimated over a plurality of RBs in the RBG.

Figure 14:
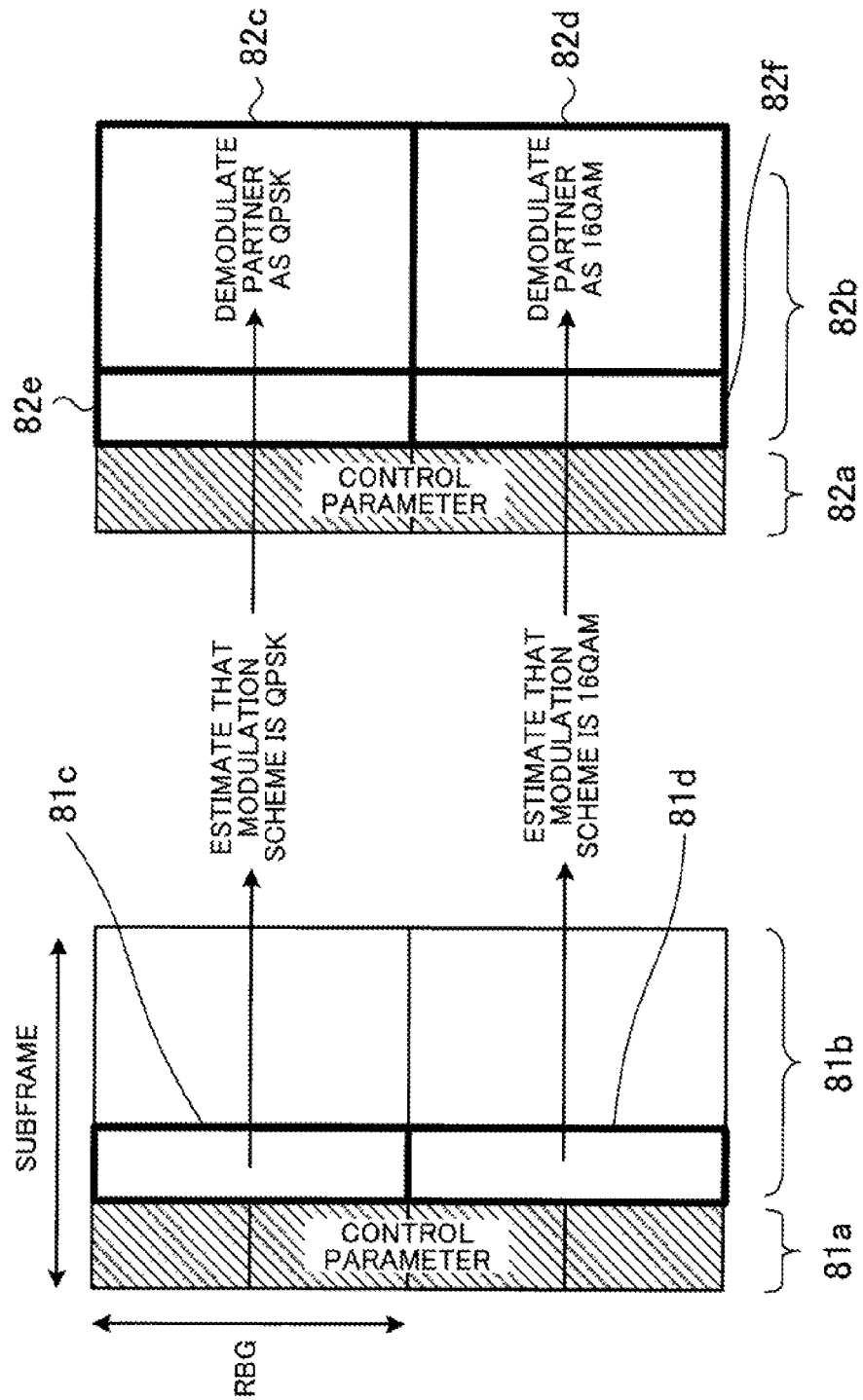
FIG. 14 illustrates a case where estimation and demodulation of a modulation scheme are performed in an RBG unit.

FIG. 14 illustrates a case of estimating and demodulating the modulation scheme in an RBG unit.

In FIG. 14, the radio resources assigned to the radio terminal 11 are illustrated. The radio resource illustrated in the left side of FIG. 14 illustrates radio resources at steps of estimating the modulation schemes of the other radio terminals 12 and A. The radio resource illustrated in the right side of FIG. 14 illustrates radio resources at steps of demodulating data.

Areas 81a and 82a illustrated in FIG. 14 represent the control areas. Areas 81b and 82b represent the data areas.

As illustrated in frames 81c and 81d of the radio resources illustrated in the left side of FIG. 14, the modulation scheme estimation unit 35 of the radio terminal 11 estimates the modulation schemes of the other radio terminals 12 and A in the RBG unit. The modulation scheme estimation unit 35 estimates the modulation schemes of the other radio terminals 12 and A based on the predetermined information obtained in the MLD process stage of the data in the predetermined area from the head of the data area.

For example, based on the predetermined information obtained in the MLD process stage of all or part of REs in the frame 81c, the modulation scheme estimation unit 35 estimates that the modulation scheme of the other radio terminal 12 is QPSK. Based on the predetermined information obtained in the MLD process stage of all or part of REs in the frame 81d, the modulation scheme estimation unit 35 further estimates that the modulation scheme of the other radio terminal A is 16 QAM.

The demodulation unit 34 demodulates data after the estimation of the modulation scheme by using the estimated modulation scheme. For example, the demodulation unit 34 demodulates data illustrated in the frame 82c of the radio resources illustrated in the right side of FIG. 14 by using the estimated modulation scheme QPSK. The demodulation unit 34 further demodulates data illustrated in the frame 82d by using the estimated modulation scheme 16 QAM. Frames 82e and 82f represent an area of the data used for estimating the modulation scheme, and correspond to the frames 81c and 81d.

In the data of the frames 82e and 82f, during the estimation processing of the modulation scheme, distance information is calculated by using the QPSK operation unit 41a, the 16 QAM operation unit 41b, and the 64 QAM operation unit 41c.

The calculated distance information is stored in the buffers 42a to 42c. Therefore, the demodulation unit 34 eliminates the need to perform MLD of the data in the frames 82e and 82f.

As can be seen from the above sequence, the radio terminal 11 estimates the modulation schemes applied to signals to the other radio terminals 12 and A based on the predetermined information obtained in the MLD process stage of a predetermined area from the head of the data area of the radio resources. As a result, the radio terminal 11 performs MLD by using the plurality of modulation schemes during the estimation of the modulation scheme. After the estimation of the modulation scheme, the radio terminal 11 performs demodulation by using the distance information corresponding to the modulation scheme and suppresses a delay of the data processing.

Fourth Embodiment

Next, a fourth embodiment will be described in detail with reference to the accompanying drawings. In the MLD of the first to third embodiments, estimation precision of the modulation scheme may be degraded due to reduction in channel quality. An error rate of the MLD may be deteriorated as compared with a demodulation scheme such as an MMSE or ZF. To cope with the above problem, in the fourth embodiment, the demodulation scheme is switched according to the channel quality.

Figure 15:
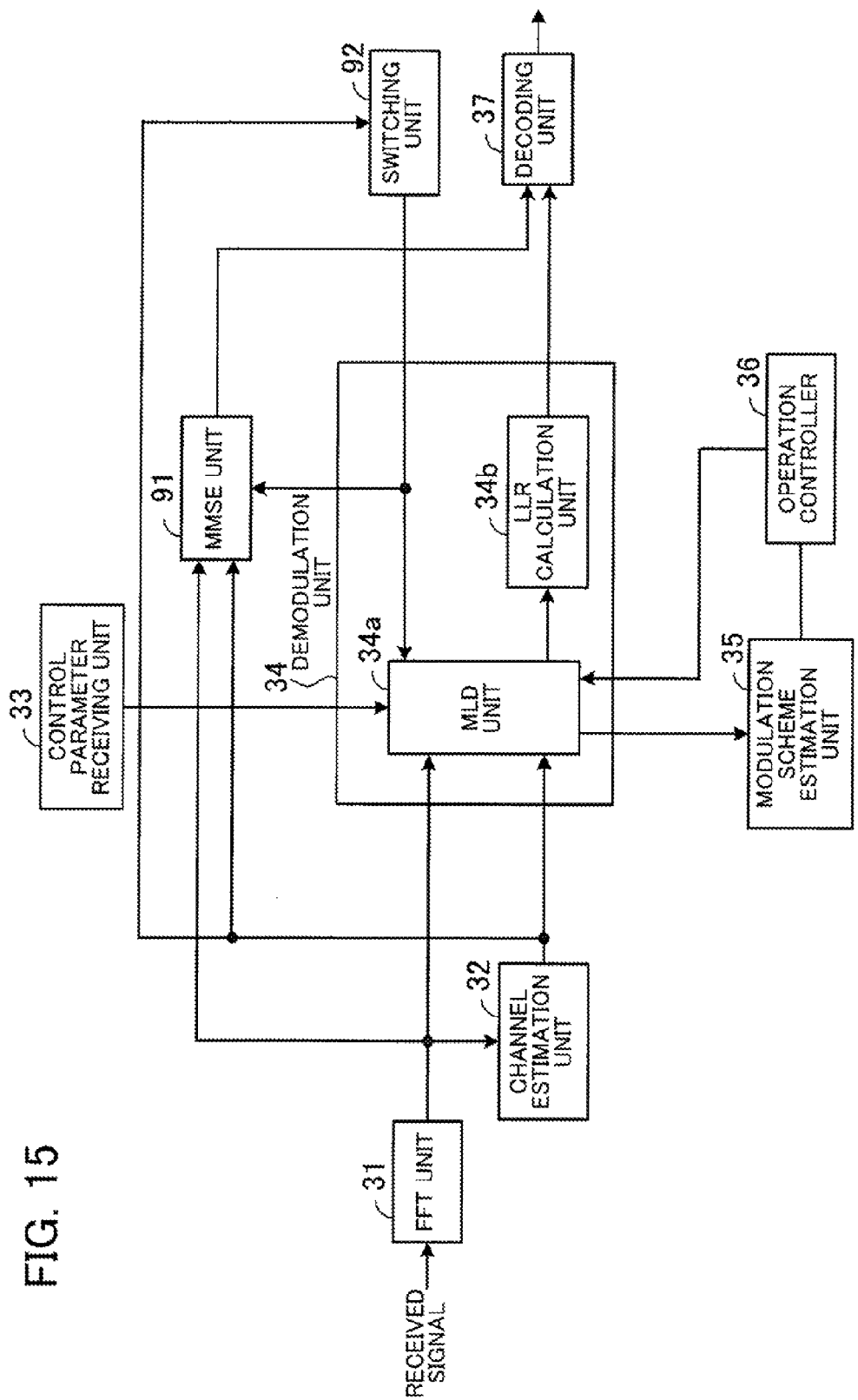
FIG. 15 is a block diagram illustrating a radio terminal according to a fourth embodiment.

FIG. 15 is a block diagram illustrating a radio terminal according to the fourth embodiment. In FIG. 15, the same circuit elements as those of FIG. 8 are indicated by the same reference numerals as in FIG. 8, and the description will not be repeated here.

As illustrated in FIG. 15, the radio terminal 11 has an MMSE unit 91 and a switching unit 92. To the MMSE unit 91, signals obtained by converting a received signal into a frequency domain through the FFT unit 31 and channel estimation values estimated by the channel estimation unit 32 are supplied. The MMSE unit 91 demodulates signals produced from the FFT unit 31 by using MMSE. Even if the modulation scheme of the other multiplexed radio terminal 12 is not notified, the MMSE unit 91 demodulates the signals. The signals demodulated by the MMSE unit 91 are supplied to the decoding unit 37.

To the switching unit 92, the channel estimation value calculated by the channel estimation unit 32 is supplied. The switching unit 92 measures an SNR (Signal-Noise Ratio) in the DL by using the supplied channel estimation value. Namely, the switching unit 92 measures the channel quality in the DL. Based on the measured SNR, the switching unit 92 supplies an active signal for activizing one of the MMSE unit 91 and the MLD unit 34a.

For example, if the measured SNR is larger than a predetermined threshold, the switching unit 92 supplies the active signal to the MLD unit 34a so that the MLD unit 34a may demodulate signals. On the other hand, if the measured SNR is smaller than or equal to the predetermined threshold, the switching unit 92 supplies the active signal to the MMSE unit 91 so that the MMSE unit 91 may demodulate signals.

As can be seen from the above sequence, based on the channel quality, the radio terminal 11 activizes one of the MLD unit 34a and the MMSE unit 91, and demodulates signals. Through the process, even if the estimation precision of the modulation scheme is degraded due to reduction in the channel quality, the radio terminal 11 suppresses reduction in the error rate.

In the above, the demodulation scheme is switched into one of the MLD and MMSE; further, the demodulation scheme may be switched into one of the MLD and ZF. For example, the MMSE unit 91 may be replaced by a ZF unit which demodulates signals by using the ZF. That is, the MMSE unit 91 may be replaced by a demodulation unit which demodulates signals even if the modulation scheme of the other multiplexed radio terminal 12 is not notified.

In the above, the switching unit 92 measures an SNR and activizes one of the MLD unit 34a and the MMSE unit 91; further, the switching unit 92 may activize one of the MLD unit 34a and the MMSE unit 91 according to one or both of the modulation scheme and coding rate of signals to the radio terminal 11.

In the LTE and LTE-A systems, the base station 13 transmits signals to the radio terminal 11 by using the modulation scheme and coding rate according to the channel quality. The modulation scheme and coding rate is transmitted through the control parameter from the base station 13 to the radio terminal 11. The radio terminal 11 then estimates the channel quality by using one or both of the modulation scheme and coding rate transmitted by the base station 13.

For example, in the case where the modulation scheme of QPSK is applied to signals to its own, the switching unit 92 determines that the channel quality in the DL is deteriorated, and activizes the MMSE unit 91. Or alternatively, when the QPSK or 16 QAM is applied to signals to its own and the coding rate is smaller than or equal to a predetermined threshold, the switching unit 92 activizes the MMSE unit 91.

Figure 16:
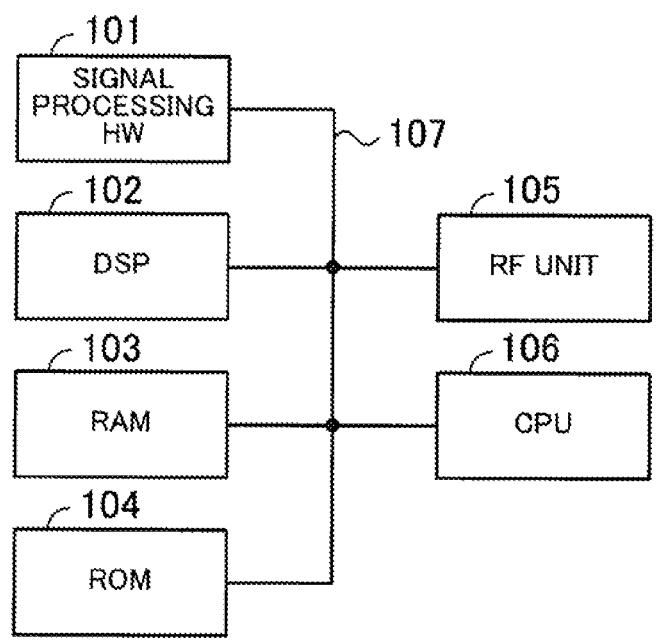
FIG. 16 illustrates a hardware configuration example of a radio terminal.

FIG. 16 illustrates a hardware configuration example of the radio terminal. As illustrated in FIG. 16, the radio terminal 11 includes a signal processing HW 101, a DSP 102, a RAM (Random Access Memory) 103, a ROM (Read Only Memory) 104, an RF (Radio Frequency) unit 105, a CPU 106, and a bus 107. The signal processing HW 101, DSP 102, RAM 103, ROM 104, RF unit 105, and CPU 106 are connected to the bus 107.

The RF unit 105 receives radio signals and converts the received radio signals into baseband signals. The baseband signals are supplied, for example, to the FFT unit 31 illustrated in FIG. 8.

The signal processing HW 101 performs signal processing through hardware. The DSP 102 performs signal processing through firmware. The signal processing is normally performed by using any of the signal processing HW 101 and the DSP 102. Since the signal processing HW 101 and the DSP 102 are different in a type of favorite processing, the signal processing HW 101 may be called up from the DSP 102. Functions of the demodulation unit 34 and modulation scheme estimation unit 35 illustrated in FIGS. 8 and 15 are implemented through one or both of the signal processing HW 101 and the DSP 102.

Functions of the operation controller 36 illustrated in FIGS. 8 and 15 are implemented through the CPU 106. Further, functions of the switching unit 92 illustrated in FIG. 15 are implemented through the CPU 106. Note that since the signal processing HW 101, the DSP 102, and the CPU 106 compensate mutual processing, the configuration is not limited thereto. For example, functions of the operation controller 36 and the switching unit 92 may be implemented through the DSP 102.

The RAM 103 is a writable memory, and a value in process of calculation, a value of calculation result, and data to be processed by the signal processing HW 101, the DSP 102, and the CPU 106 are temporarily stored therein. In the RAM 103, for example, a received signal, a channel value, and a value of each matrix after the QR decomposition are temporarily stored. The buffers 42a to 42c illustrated in FIG. 9 and the buffers 51a to 51c illustrated in FIG. 10 are implemented through the RAM 103.

The ROM 104 is a read-only memory, and constants used in the signal processing HW 101, the DSP 102, and the CPU 106 are preliminarily stored therein. For example, a coefficient different for each modulation scheme, the number of REs to be averaged, and a threshold for determining switching of a demodulation scheme are stored in the ROM 104. Programs to be executed by the DSP 102 and the CPU 106 are further stored in the ROM 104.

The hardware configuration example illustrated in FIG. 16 is not limited to estimation of the modulation scheme and processing of the MLD. According to the hardware configuration example illustrated in FIG. 16, for example, the functions of the FFT unit 31, channel estimation unit 32, control parameter receiving unit 33, and decoding unit 37 illustrated in FIGS. 8 and 15 may also be implemented. In addition, the function of each unit illustrated in FIG. 1 may be implemented according to the hardware configuration example illustrated in FIG. 16.

According to the proposed apparatus and method, even if modulation schemes of the other radio terminals are not notified, a received signal may be demodulated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio terminal to perform radio communication by using a plurality of antennas, comprising:
    a receiving unit which receives information on a first modulation scheme applied to a first signal that a transmission apparatus transmits to the radio terminal, together with a second signal to another radio terminal, with multi-user multiple-input and multiple-output (MU-MIMO) techniques;
    a maximum likelihood detection unit which performs maximum likelihood detection of a received signal by using a plurality of possible combinations of the first modulation scheme indicated by the received information and a different one of a plurality of second modulation schemes applicable to the second signal transmitted to said another radio terminal;
    an estimation unit which estimates which one of the second modulation schemes is being applied to the second signal, based on a plurality of values representing predetermined information which are obtained in the maximum likelihood detection performed for the plurality of possible combinations of the first and second modulation schemes; and
    a controller which configures the maximum likelihood detection unit to perform maximum likelihood detection to obtain the first signal from the received signal, by using the estimated second modulation scheme in addition to the indicated first modulation scheme.

2. The radio terminal according to claim 1, wherein the estimation unit calculates metrics by weighting the plurality of values obtained in the maximum likelihood detection, and estimates the second modulation scheme applied to the second signal based on the metrics.

3. The radio terminal according to claim 1, wherein the predetermined information is a minimum distance or minimum cumulative distance between a received symbol and replicas generated in the maximum likelihood detection by the maximum likelihood detection unit.

4. The radio terminal according to claim 1, wherein the plurality of values of the predetermined information are obtained by performing the maximum likelihood detection on a head of a data area of radio resources.

5. The radio terminal according to claim 1, further comprising:
    a demodulation unit which performs demodulation even if the second modulation scheme is not known; and
    a switching unit which activizes one of the maximum likelihood detection unit and the demodulation unit based on channel quality.

6. A demodulation method of a radio terminal which performs radio communication by using a plurality of antennas, comprising:
    receiving information on a first modulation scheme applied to a first signal that a transmission apparatus transmits to the radio terminal, together with a second signal to another radio terminal, with multi-user multiple-input and multiple-output (MU-MIMO) techniques;
    performing maximum likelihood detection of a received signal by using a plurality of possible combinations of the first modulation scheme indicated by the received information and a different one of a plurality of second modulation schemes applicable to the second signal transmitted to said another radio terminal;
    estimating which one of the second modulation schemes is being applied to the second signal, based on a plurality of values representing predetermined information which are obtained in the maximum likelihood detection performed for the plurality of possible combinations of the first and second modulation schemes; and
    performing maximum likelihood detection to obtain the first signal from the received signal, by using the estimated second modulation scheme in addition to the indicated first modulation scheme.

7. The radio terminal according to claim 3, wherein:
    the maximum likelihood detection produces as many replicas as a product of a first number determined from the first modulation scheme and a second number determined from one of the second modulation schemes that is assumed; and
    the estimation unit estimates which one of the second modulation schemes is being applied to the second signal, by comparing the possible combinations of the first and second modulation schemes in terms of averaged minimum distances or averaged minimum cumulative distances.

8. The radio terminal according to claim 5, wherein the switching unit measures a signal-to-noise ratio (SNR) of the received signal, and activates the maximum likelihood detection unit when the measured SNR is larger than a predetermined threshold and the demodulation unit when the measured SNR is smaller than or equal to the predetermined threshold.

* * * * *